United States Patent
Fujita et al.

(10) Patent No.: US 7,392,101 B2
(45) Date of Patent: Jun. 24, 2008

(54) MULTI-TRACK DIGITAL RECORDING/REPRODUCING APPARATUS AND METHOD, MULTI-TRACK DIGITAL RECORDING/REPRODUCING PROGRAM

(75) Inventors: Yoshio Fujita, Hamamatsu (JP); Yoshinori Kawase, Hamamatsu (JP)

(73) Assignee: Yamaha Corporation, Hamamatsu-Shi (JP)

(*) Notice: Subject to any disclaimer, the term of this patent is extended or adjusted under 35 U.S.C. 154(b) by 671 days.

(21) Appl. No.: 09/912,963

(22) Filed: Jul. 25, 2001

(65) Prior Publication Data
US 2002/0065570 A1 May 30, 2002

(30) Foreign Application Priority Data

| Jul. 31, 2000 | (JP) | ............................. 2000-232525 |
| Jul. 31, 2000 | (JP) | ............................. 2000-232526 |
| Jul. 31, 2000 | (JP) | ............................. 2000-232527 |

(51) Int. Cl.
 G06F 17/00 (2006.01)
 H04B 1/00 (2006.01)
 H04B 1/20 (2006.01)
(52) U.S. Cl. ............................. 700/94; 381/119; 369/4
(58) Field of Classification Search .................... 700/94; 381/119; 369/4
See application file for complete search history.

(56) References Cited

U.S. PATENT DOCUMENTS

| 5,515,352 A | 5/1996 | Iizuka |
| 6,870,936 B1 * | 3/2005 | Ajamian ..................... 381/119 |

FOREIGN PATENT DOCUMENTS

| JP | 58105414 | 6/1983 |
| JP | 3189984 | 8/1991 |
| JP | 6121339 | 4/1994 |

OTHER PUBLICATIONS

Roland Corporation, VS-1680 Owner's Manual, copyright 1998, pp. 1-209.*

Roland Corporation, VS-1680 Appendices, copyright 1998, 1-12.*

Signal Processing of a 20-Bit 8-Channel Digital Audio Recorder, T. Iwaki, et al., 8087 IEEE Transactions on Consumer Electonics 36 Aug. 1990, No. 3, New York, US.

Yamaha Corporation, AW4416, Professional Audio Workstation Operation Guide, Internet Article, Online, Sep. 2, 2003, pp. 1-284, XP-002308287.

(Continued)

Primary Examiner—Sinh Tran
Assistant Examiner—Daniel R Sellers
(74) Attorney, Agent, or Firm—Morrison & Foerster LLP

(57) ABSTRACT

There are provided multi-track recording/reproducing apparatus and method and a multi-track recording/reproducing program, which enable flexible setting of the number of reproducing tracks and that of recording tracks and also facilitates the setting. At least one track for recording is designated from a plurality of tracks, as desired. The number of tracks that can be reproduced is determined in response to the designation of the at least one track for recording. The number of tracks for reproduction is limited to the number of tracks that can be reproduced, by automatically muting at least predetermined one of tracks designated for reproduction, when the number of tracks designated for reproduction is larger than the number of tracks that can be reproduced.

4 Claims, 11 Drawing Sheets

OTHER PUBLICATIONS

Yamaha Corporation, AW4416 Professional Audio workstation Reference Guide, Internet Article, Online!, Sep. 2, 2003, pp. 1-190, XP-002308286.

Yamaha Corporation, AW4416 Professional Audio Workstation, Internet Article, Online!, Oct. 20, 2003, pp. 1-6, XP002308285.

Yamaha Corporation, Chapter 5, Recording on the AW4416, Operation Guide, pp. 73-174.

Yamaha Corporation, Chapter 11, Song Management, AW4416, Operation Guide, pp. 175-269.

Yamaha Corporation, AW416 Reference Guide, Appendix, pp. 1-54.

Sound on Sound, AW Inspiring, Yamaha AW4416 Digital Audio Workstation, XP002308283, Nov. 23, 2004, pp. 1-6.

Playmaster 145, XP008039488, Electronics Australia, Leo Simpson, Feb. 1975, pp. 42-47.

Recording System Integrates Digital Mixer and Recorder, Hiromi Sohtome, Yamaha Corporation, JEE Journal of Electronics Engineering Special Issue NAB, 90, 27 (1990) Tokyo, Japan, pp. 76-79.

Mixing Console Automation, Record Producer, Nov. 23, 2004, XP002308284, pp. 1-2.

* cited by examiner

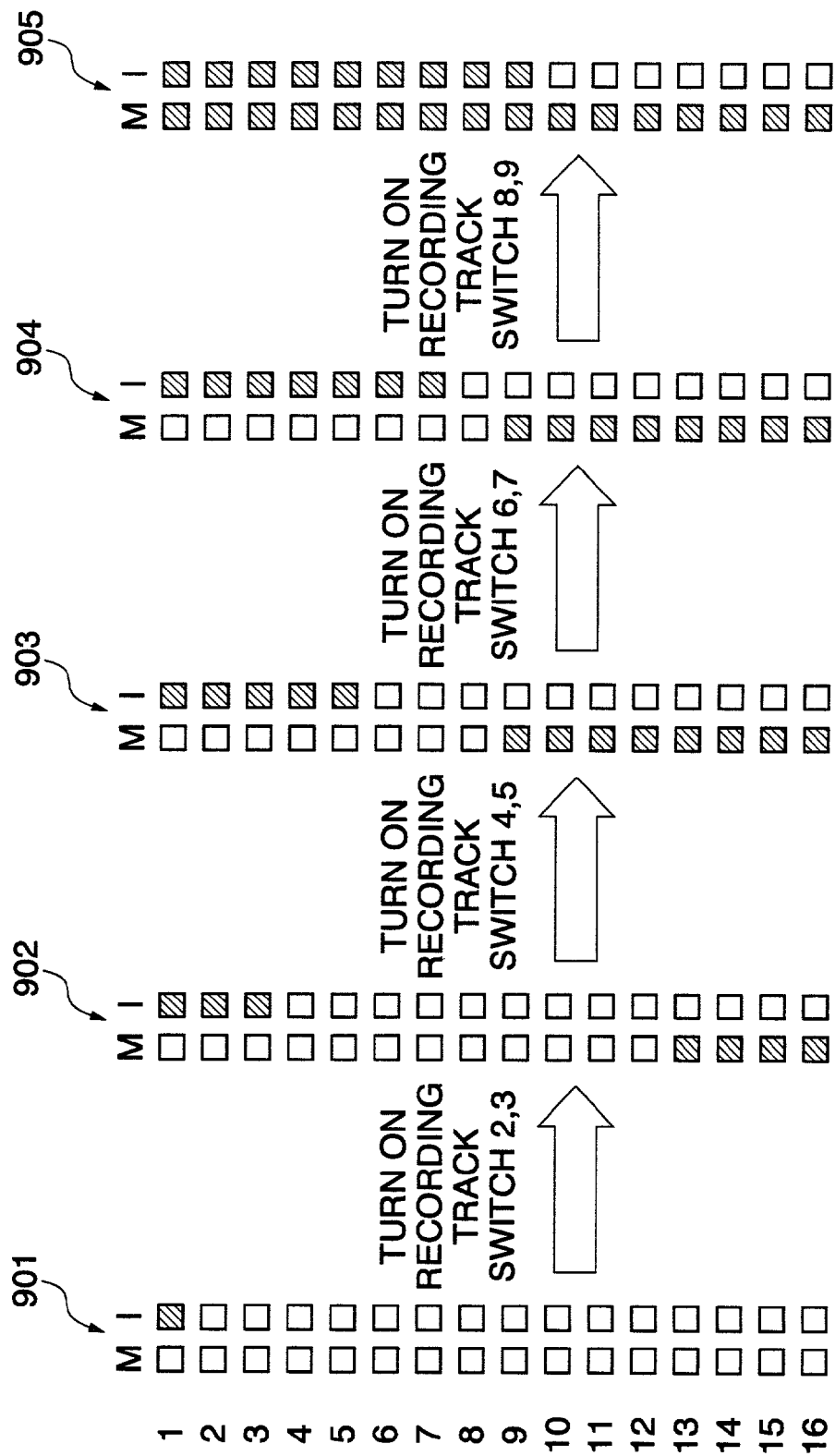

MULTI-TRACK DIGITAL RECORDING/REPRODUCING APPARATUS AND METHOD, MULTI-TRACK DIGITAL RECORDING/REPRODUCING PROGRAM

BACKGROUND OF THE INVENTION

1. Field of the Invention

This invention relates to multi-track recording/reproducing apparatus and method and a multi-track recording/reproducing program which are capable of recording digital audio data on an external storage device, such as a hard disk device, by using multiple tracks, and reproducing the same.

2. Prior Art

Conventionally, there is known a digital mixer which converts input audio data in the form of an analog signal to digital data, or inputs digital audio data directly, then mixes the digital data, and outputs the mixed data. In this digital mixer, each input terminal is fixedly connected to a corresponding one of mixer channels. Audio data in a plurality of predetermined mixer channels are mixed according to the user's designation and then delivered to a single output bus. Each of output buses is fixedly connected to a corresponding one of output terminals, from which the mixed output is taken out.

Further, a digital recorder is conventionally known, which records digital audio data on an external storage device, such as a hard disk device, and reproduces the same. This digital recorder includes a multi-track type which is capable of assigning a plurality of series of audio data to a plurality of tracks, respectively, and then recording the audio data in the respective tracks.

Recently, there is also known a combination type which is a combination of the above-mentioned digital mixer and digital recorder.

This combination type includes a type which is capable of selecting either a compression mode or a non-compression mode in advance. For example, in the compression mode, it is possible to perform 8-track recording and 16-track reproduction, whereas in the non-compression mode, it is possible to perform 8-track recording and 8-track reproduction. The combination type includes another type which is capable of selecting either a 16-bit mode or a 24-bit mode in advance. For example, in the 16-bit mode, it is possible to perform 8-track recording and 16-track reproduction, whereas in the 24-bit mode, it is possible to perform 8-track recording and 8-track reproduction.

In the conventional digital mixer, since each input terminal is fixedly connected to a corresponding one of the mixer channels, when the user wants to change the input source, it is required to physically or mechanically change connections between the terminals and the mixer channels. However, if the degree of freedom is increased in changing connections between the terminals and the mixer channels, the relationship between the terminals and the mixer channels may become too complicated for the user to grasp. Further, since each output terminal is fixedly connected to a corresponding one of the mixing buses, when the user wants to change the output source, an output terminal connected to a desired output source has to be selected as one for connection.

Further, in the conventional apparatus of the combination type, input of a signal reproduced by the recorder to the mixer is equivalent to input of a signal from an external device (such as an electric guitar or a synthesizer) to the mixer, and output of data from the mixer to the recorder for recording is equivalent to output of data from the mixer to an external device (such as an effector or an amplifier). Therefore, the conventional apparatus of the combination type suffers from the same inconvenience as the above described convenience with the conventional digital mixer, and hence input to and output from the mixer cannot be changed flexibly.

On the other hand, it can be also considered that the apparatus can permit freely setting the connections between the input terminals and the mixer channels and between the output terminals and the mixing buses, e.g. freely assigning mixer channels to input terminals and mixing buses to output terminals. This, however, takes much time in carrying out the settings, and degrades the usability of the apparatus.

Further, since the number of recording tracks is fixed in each mode, it is impossible to flexibly meet users' demand for an increase in the number of the recording tracks at the cost of a decrease in the number of reproducing tracks. Especially in a live recording, since there is no need to use any tracks for simultaneous recording and reproduction, it is desired that as many tracks as possible are used for recording.

SUMMARY OF THE INVENTION

It is a first object of the present invention to provide multi-track recording/reproducing apparatus and method and a multi-track recording/reproducing program, which enable flexible setting of the number of reproducing tracks and that of recording tracks and also facilitates the setting.

It is a second object of the present invention to provide multi-track recording/reproducing apparatus and method and a multi-track recording/reproducing program, which are capable of flexibly assigning channels of the mixer to various inputs and flexibly assigning outputs from various mixed outputs from the mixing buses to various outputs, while enabling a user to grasp at a glance how the channels are used for recording.

To attain the first object, a first aspect of the invention provides a multi-track digital recording/reproducing apparatus for recording and reproducing digital audio data by using multiple tracks, comprising a recording track-designating section that designates at least one track for recording, from a plurality of tracks, as desired, a reproducible track number-determining section that determines a number of tracks that can be reproduced, in response to the designation of the at least one track for recording, and a reproducing track number-limiting section that limits a number of tracks for reproduction to the number of tracks that can be reproduced, by automatically muting at least predetermined one of tracks designated for reproduction, when the number of tracks designated for reproduction is larger than the number of tracks that can be reproduced.

The first aspect of the invention also provides a multi-track digital recording/reproducing method using a multi-track digital recording/reproducing apparatus for recording and reproducing digital audio data by using multiple tracks, the multi-track digital recording/reproducing method comprising the steps of designating at least one track for recording, from a plurality of tracks, as desired, determining a number of tracks that can be reproduced, in response to the designation of the at least one track for recording, and limiting a number of tracks for reproduction to the number of tracks that can be reproduced, by automatically muting at least predetermined one of tracks designated for reproduction, when the number of tracks designated for reproduction is larger than the number of tracks that can be reproduced.

Further, the first aspect of the invention also provides a recording/reproducing program executed by a computer, the program using a multi-track digital recording/reproducing apparatus for recording and reproducing digital audio data by using multiple tracks, the program comprising a recording track-designating module that designates at least one track for recording, from a plurality of tracks, as desired, a reproducible track number-determining module that determines a number of tracks that can be reproduced, in response to the designation of the at least one track for recording, and a reproducing track number-limiting module that limits a number of tracks for reproduction to the number of tracks that can be reproduced, by automatically muting at least predetermined one of tracks designated for reproduction, when the number of tracks designated for reproduction is larger than the number of tracks that can be reproduced.

According to the multi-track digital recording/reproducing apparatus, method and program of the first aspect of the invention, the number of tracks available for reproduction is determined according to the number of tracks designated for recording, and when the number of the tracks designated for reproduction is larger than that of the tracks available for reproduction, at least one predetermined track among the tracks designated for reproduction is muted to thereby limit the lumber of tracks for reproduction to the number of the tracks available for reproduction. Therefore, recording tracks can be flexibly set, and at the same time it is possible to use as many tracks as possible within a range permitted by the setting of the recording tracks.

Preferably, the multi-track digital recording/reproducing apparatus includes a reproducing track-changing section that is capable of changing any of the tracks designated for reproduction, so long as the number of tracks designated for reproduction is equal to or smaller than the number of tracks that can be reproduced.

To attain the above second object, a second aspect of the invention provides a multi-track digital recording/reproducing apparatus for recording and reproducing digital audio data by using multiple tracks, comprising a multi-track recorder that is capable of performing recording and reproduction of data on a plurality of tracks, a plurality of external input terminals that are capable of receiving data from at least one external device, a plurality of external output terminals that are capable of outputting data to at least one external device, a plurality of mixer input channels that control characteristics of data inputted thereto and output the data, a first selection section that causes data inputted to the external input terminals to be selectively inputted to at least designated one of the mixer input channels, a plurality of mixing buses that each mix data inputted thereto and output the mixed data, a second selection section that causes data outputted from the tracks of the multi-track recorder to be selectively inputted to at least designated one of the mixing buses, a third selection section that causes the data outputted from the mixer input channels to be selectively inputted to at least designated one of the mixing buses, a fourth selection section that causes the mixed data outputted from each of the mixing buses to be selectively inputted to at least designated one of the external output terminals as data to be outputted therefrom, a fifth selection section that causes the mixed data outputted from each of the mixing buses to be selectively inputted to at least designated one of the tracks of the multi-track recorder, a display section that displays in text format selection settings of the first selection section for selective input of the data inputted to the external input terminals to the at least designated one of the mixer input channels, and at the same time displays in graphical representation selection settings of the third selection section for selective input of the data outputted from the mixer input channels to the at least designated one of the mixing buses and selection settings of the fifth selection section for selective input of the mixed data from each of the mixing buses to the at least designated one of the tracks in a manner following respective data transfer paths, and a selection control section that changes the selection settings of the first, third and fifth selection sections and selection settings of the second and fourth selection sections in response to user's instructions.

The second aspect of the invention also provides a multi-track digital recording/reproducing method using a multi-track digital recording/reproducing apparatus for recording and reproducing digital audio data by using multiple tracks, the apparatus including a multi-track recorder that is capable of performing recording and reproduction of data on a plurality of tracks, a plurality of external input terminals that are capable of receiving data from at least one external device, a plurality of external output terminals that are capable of outputting data to at least one external device, a plurality of mixer input channels that control characteristics of data inputted thereto and output the data, and a plurality of mixing buses that each mix data inputted thereto and output the mixed data, the multi-track digital recording/reproducing method comprising the steps of causing data inputted to the external input terminals to be selectively inputted to at least designated one of the mixer input channels, causing data outputted from the tracks of the multi-track recorder to be selectively inputted to at least designated one of the mixing buses, causing the data outputted from the mixer input channels to be selectively inputted to at least designated one of the mixing buses, causing the mixed data outputted from each of the mixing buses to be selectively inputted to at least designated one of the external output terminals as data to be outputted therefrom, causing the mixed data outputted from each of the mixing buses to be selectively inputted to at least designated one of the tracks of the multi-track recorder, displaying in text format selection settings for selective input of the data inputted to the external input terminals to the at least designated one of the mixer input channels, and at the same time displaying in graphical representation selection settings for selective input of the data outputted from the mixer input channels to the at least designated one of the mixing buses, and selection settings for selective input of the mixed data from each of the mixing buses to the at least designated one of the tracks of the multi-track recorder in a manner following respective data transfer paths, and changing the selection settings for selective input of the data inputted to the external input terminals to the at least designated one of the mixer input channels, the selection settings for selective input of the data outputted from the mixer input channels to the at least designated one of the mixing buses, and the selection settings for selective input of the mixed data from each of the mixing buses to the at least designated one of the tracks of the multi-track recorder, and selection settings for selective input of the data outputted from the tracks of the multi-track recorder to the at least designated one of the mixing buses, and selection settings for selective input of the mixed data outputted from each of the mixing buses to the at least designated one of the external output terminals, in response to user's instructions.

Further, the second aspect of the invention also provides a recording/reproducing program executed by a computer, the program using a multi-track digital recording/reproducing apparatus for recording and reproducing digital audio data by using multiple tracks, the apparatus including a multi-track recorder that is capable of performing recording and reproduction of data on a plurality of tracks, a plurality of external input terminals that are capable of receiving data from at least one external device, a plurality of external output terminals that are capable of outputting data to at least one external device, a plurality of mixer input channels that control characteristics of data inputted thereto and output the data, and a plurality of mixing buses that each mix data inputted thereto and output the mixed data, the program comprising a first selection module that causes data inputted to the external input terminals to be selectively inputted to at least designated one of the mixer input channels, a second selection module that causes data outputted from the tracks of the multi-track recorder to be selectively inputted to at least designated one of the mixing buses, a third selection module that causes the data outputted from the mixer input channels to be selectively inputted to at least designated one of the mixing buses, a fourth selection module that causes the mixed data outputted from each of the mixing buses to be selectively inputted to at least designated one of the external output terminals as data to be outputted therefrom, a fifth selection module that causes the mixed data outputted from each of the mixing buses to be selectively inputted to at least designated one of the tracks of the multi-track recorder, a display module that displays in text format selection-settings by the first selection module for selective input of the data inputted to the external input terminals to the at least designated one of the mixer input channels, and at the same time displays in graphical representation selection settings by the third selection module for selective input of the data outputted from the mixer input channels to the at least designated one of the mixing buses and selection settings by the fifth selection module for selective input of the mixed data from each of the mixing buses to the at least designated one of the tracks, in a manner following respective data transfer paths, and a selection settings-changing module that changes the selection settings by the first, third and fifth selection modules, and selection settings by the second and fourth selection modules in response to user's instructions.

According to the multi-track digital recording/reproducing apparatus, method and program of the second aspect of the invention, as to each mixer input channel, it is possible to comprehend flows of signals associated with the mixer input channels from signal input sources to outputs for recording.

Preferably, the multi-track digital recording/reproducing apparatus includes operating elements that a user operates to give instructions to the apparatus, and the selection control section changes the selection settings of the first selection section according to user's operation of at least one of the operating elements, and at the same time changes a display in text format of the selection settings of the first selection section on the display section, in accordance with the changes in the selection settings of the first selection section.

According to this preferred embodiment, as to each mixer channel, it is possible to select an input source of a signal to be inputted to the mixer input channel while recognizing a track for recording the signal from the mixer input channel.

Preferably, the multi-track digital recording/reproducing apparatus includes operating elements that a user operates to give instructions to the apparatus, and the selection control section changes the selection settings of the third selection section according to user's operation of at least one of the operating elements, and at the same time changes a display in graphical representation of the selection settings of the third selection section on the display section, in accordance with the changes in the selection settings of the third selection section.

According to this preferred embodiment, as to each mixer channel, it is possible to select each mixing bus to which a signal is to be inputted while recognizing a track receiving a signal from the mixing bus.

To attain the second object, a third aspect of the invention provides a multi-track digital recording/reproducing apparatus for recording and reproducing digital audio data by using multiple tracks, comprising a multi-track recorder that is capable of performing recording and reproduction of data on a plurality of tracks, a plurality of external output terminals that are capable of outputting data to at least one external device, a plurality of mixer input channels that control characteristics of data inputted thereto and output the data, a plurality of mixing buses that each mix data inputted thereto and output the mixed data, a first selection section that causes data outputted from each of the tracks of the multi-track recorder to be selectively inputted to at least designated one of the mixing buses, a second selection section that causes the data outputted from the mixer input channels to be selectively inputted to at least designated one of the mixing buses, a third selection section that causes data outputted from each of the mixing buses to be selectively inputted to at least designated one of the external output terminals as data to be outputted therefrom, a fourth selection section that causes data outputted from each of the mixing buses to be selectively inputted to at least designated one of the tracks of the multi-track recorder, a display section that displays in graphical representation, concerning the mixer input channels, a first setting display showing selection settings of the second selection section for selective input of the data from the mixer input channels to the at least designated one of the mixing buses, and a second setting display showing selection settings of the fourth selection section for selective input of the mixed data from each of the mixing buses to the at least designated one of the tracks in an manner following respective data transfer paths, and a selection control section that changes the selection settings of the second selection section in response to user's instructions, and at the same time changes the first setting display displayed on the display section in graphical representation, in accordance with the changes in the selection settings of the second selection section.

The third aspect of the invention also provides a multi-track digital recording/reproducing method using a multi-track digital recording/reproducing apparatus for recording and reproducing digital audio data by using multiple tracks, the apparatus including a multi-track recorder that is capable of performing recording and reproduction of data on a plurality of tracks, a plurality of external output terminals that are capable of outputting data to at least one external device, a plurality of mixer input channels that control characteristics of data inputted thereto and output the data, and a plurality of mixing buses that each mix data inputted thereto and output the mixed data, the multi-track digital recording/reproducing method comprising the steps of causing data outputted from each of the tracks of the multi-track recorder to be selectively inputted to at least designated one of the mixing buses, causing the data outputted from the mixer input channels to be selectively inputted to at least designated one of the mixing buses, causing data outputted from each of the mixing buses to be selectively inputted to at least designated one of the external output terminals as data to be outputted therefrom, causing data outputted from each of the mixing buses to be selectively inputted to at least designated one of the tracks of the multi-track recorder, displaying in graphical representation, concerning the mixer input channels, a first setting display showing selection settings for selective input of the data from the mixer input channels to the at least designated one of the mixing buses, and a second setting display showing selection settings for selective input of the mixed data from each of the mixing buses to the at least designated one of the tracks, in an manner following respective data transfer paths, and changing the selection settings for selective input of the data from the mixer input channels to the at least designated one of the mixing buses in response to user's instructions, and at the same time changes the first setting display displayed in graphical representation, in accordance with the changes in the selection settings.

Further, the third aspect of the invention also provides a recording/reproducing program executed by a computer, the program using a multi-track digital recording/reproducing apparatus for recording and reproducing digital audio data by using multiple tracks, the apparatus including a multi-track recorder that is capable of performing recording and reproduction of data on a plurality of tracks, a plurality of external output terminals that are capable of outputting data to at least one external device, a plurality of mixer input channels that control characteristics of data inputted thereto and output the data, and a plurality of mixing buses that each mix data inputted thereto and output the mixed data, the program comprising a first selection module that causes data outputted from each of the tracks of the multi-track recorder to be selectively inputted to at least designated one of the mixing buses, a second selection module that causes the data outputted from the mixer input channels to be selectively inputted to at least designated one of the mixing buses, a third selection module that causes data outputted from each of the mixing buses to be selectively inputted to at least designated one of the external output terminals as data to be outputted therefrom, a fourth selection module that causes data outputted from each of the mixing buses to be selectively inputted to at least designated one of the tracks of the multi-track recorder, a display module that displays in graphical representation, concerning the mixer input channels, a first setting display showing selection settings by the second selection module for selective input of the data from the mixer input channels to the at least designated one of the mixing buses, and a second setting display showing selection settings by the fourth selection module for selective input of the mixed data from each of the mixing buses to the at least designated one of the tracks of the multi-track recorder, in an manner following respective data transfer paths, and a selection settings-changing module that changes the selection settings by the second selection module in response to user's instructions, and at the same time changes the first setting display displayed by the display module in graphical representation, in accordance with the changes in the selection settings by the second selection module.

According to the multi-track digital recording/reproducing apparatus, method and program of the third aspect of the invention, it is possible to select each mixing bus to which a signal is to be inputted while recognizing a track receiving a signal from the mixing bus.

To attain the second object, a fourth aspect of the invention provides a multi-track digital recording/reproducing apparatus for recording and reproducing digital audio data by using multiple tracks, comprising a multi-track recorder that is capable of performing recording and reproduction of data on a plurality of tracks, a plurality of external input terminals that are capable of receiving data from at least one external device, a plurality of external output terminals that are capable of outputting data to at least one external device, a plurality of mixer input channels that control characteristics of data inputted thereto and output the data, a first selection section that causes data inputted to the external input terminals to be selectively inputted to at least designated one of the mixer input channels, a plurality of mixing buses that each mix data inputted thereto and output the mixed data, a second selection section that causes the data outputted from the mixer input channels to be selectively inputted to at least designated one of the mixing buses, a plurality of recorder input channels that receive data from respective corresponding specific ones of the tracks of the multi-track recorder, controls characteristics of the data inputted thereto, and outputs the data, a third selection section that causes data outputted from the plurality of recorder input channels to be selectively inputted to designated ones of the mixing buses, a fourth selection section that causes data outputted from each of the mixing buses to be selectively inputted to at least designated one of the external output terminals as data to be outputted therefrom, a fifth selection section that causes data outputted from each of the mixing buses to be selectively inputted to at least designated one of the tracks of the multi-track recorder, and a selection control section that changes selection settings of any of the first to fifth selection sections in response to user's instructions.

The fourth aspect of the invention also provides a multi-track digital recording/reproducing method using a multi-track digital recording/reproducing apparatus for recording and reproducing digital audio data by using multiple tracks, the apparatus including a multi-track recorder that is capable of performing recording and reproduction of data on a plurality of tracks, a plurality of external input terminals that are capable of receiving data from at least one external device, a plurality of external output terminals that are capable of outputting data to at least one external device, a plurality of mixer input channels that control characteristics of data inputted thereto and output the data, a plurality of mixing buses that each mix data inputted thereto and output the mixed data, and a plurality of recorder input channels that receive data from respective corresponding specific ones of the tracks of the multi-track recorder, controls characteristics of the data inputted thereto, and outputs the data, the multi-track digital recording/reproducing method comprising the steps of causing data inputted to the external input terminals to be selectively inputted to at least designated one of the mixer input channels, causing the data outputted from the mixer input channels to be selectively inputted to at least designated one of the mixing buses, causing data outputted from the plurality of recorder input channels to be selectively inputted to designated ones of the mixing buses, causing data outputted from each of the mixing buses to be selectively inputted to at least designated one of the external output terminals as data to be outputted therefrom, causing data outputted from each of the mixing buses to be selectively inputted to at least designated one of the tracks of the multi-track recorder, and changing, in response to user's instructions, selection sections for selective input of the data inputted to the external input terminals to the at least designated one of the mixer input channels, selection sections for selective input of the data outputted from the mixer input channels to the at least designated one of the mixing buses, selection sections for selective input of the data outputted from the plurality of recorder input channels to the designated ones of the mixing buses, selection sections for selective input of the data outputted from each of the mixing buses to the at least designated one of the external output terminals, and selection sections for selective input of the data outputted from each of the mixing buses to the at least designated one of the tracks of the multi-track recorder.

Further, the fourth aspect of the invention also provides a recording/reproducing program executed by a computer, the program using a multi-track digital recording/reproducing apparatus for recording and reproducing digital audio data by using multiple tracks, the apparatus including a multi-track recorder that is capable of performing recording and reproduction of data on a plurality of tracks, a plurality of external input terminals that are capable of receiving data from at least one external device, a plurality of external output terminals that are capable of outputting data to at least one external device, a plurality of mixer input channels that control characteristics of data inputted thereto and output the data, a plurality of recorder input channels that receive data from respective corresponding specific ones of the tracks of the multi-track recorder, controls characteristics of the data inputted thereto, and outputs the data, and a plurality of mixing buses that each mix data inputted thereto and output the mixed data, the program comprising a first selection module that causes data inputted to the external input terminals to be selectively inputted to at least designated one of the mixer input channels, a second selection module that causes the data outputted from the mixer input channels to be selectively inputted to at least designated one of the mixing buses, a third selection module that causes data outputted from the plurality of recorder input channels to be selectively inputted to designated ones of the mixing buses, a fourth selection module that causes data outputted from each of the mixing buses to be selectively inputted to at least designated one of the external output terminals as data to be outputted therefrom, a fifth selection module that causes data outputted from each of the mixing buses to be selectively inputted to at least designated one of the tracks of the multi-track recorder, and a selection settings-changing module that changes selection settings by the first to fifth selection modules in response to user's instructions.

According to the multi-track digital recording/reproducing apparatus, method and program of the fourth aspect of the invention, input channels are classified into two kinds, i.e. the mixer input channels and the recorder input channels, such that signals from the external input terminals are selectively inputted to the mixer input channels, while the recorder input channels receive data from respective corresponding specific ones of the tracks of the multi-track recorder. According to this construction of the apparatus, it is possible to simplify the recorder input channels, and provide a digital recording/reproducing apparatus having an architecture enabling the user to easily comprehend the configuration or settings of the apparatus, and permitting flexible configuration of the apparatus for use.

To attain the above second object, a fifth aspect of the invention provides a multi-track digital recording/reproducing apparatus for recording and reproducing digital audio data by using multiple tracks, comprising a multi-track recorder that is capable of performing recording and reproduction of data on a plurality of tracks, a plurality of external input terminals that are capable of receiving data from at least one external device, a plurality of mixer input channels that control characteristics of data inputted thereto and output the data, a first selection section that causes data inputted to the external input terminals to be selectively inputted to at least designated one of the mixer input channels, a plurality of mixing buses that each mix data inputted thereto and output the mixed data, a second selection section that causes data outputted from each of the tracks of the multi-track recorder to be selectively inputted to at least designated one of the mixing buses, a third selection section that causes the data outputted from the mixer input channels to be selectively inputted to at least designated one of the mixing buses, a fourth selection section that causes data outputted from the plurality of mixer input channels or the mixed data outputted from the mixing buses to be selectively inputted to at least designated one of the tracks of the multi-track recorder, a display section that displays a first setting display showing selection settings of the first selection section for selective input of the data inputted to the external input terminals to the at least designated one of the mixer input channels, a second setting display showing selection settings of the fourth selection section for selective input of the data from the mixer input channels to the designated least one of the tracks, and an execution button, a display changing section that changes contents of the first setting display and contents of the second setting display, according to user's instructions, and a selection control section that changes the selection settings of the first selection section based on the changed contents of the first setting display, and the selection settings of the fourth selection section based on the changed contents of the second setting display, in response to user's operation of the execution button.

The fifth aspect of the invention also provides a multi-track digital recording/reproducing method using a multi-track digital recording/reproducing apparatus for recording and reproducing digital audio data by using multiple tracks, the apparatus including a multi-track recorder that is capable of performing recording and reproduction of data on a plurality of tracks, a plurality of external input terminals that are capable of receiving data from at least one external device, a plurality of mixer input channels that control characteristics of data inputted thereto and output the data, and a plurality of mixing buses that each mix data inputted thereto and output the mixed data, the multi-track digital recording/reproducing method comprising the steps of causing data inputted to the external input terminals to be selectively inputted to at least designated one of the mixer input channels, causing data outputted from each of the tracks of the multi-track recorder to be selectively inputted to at least designated one of the mixing buses, causing the data outputted from the mixer input channels to be selectively inputted to at least designated one of the mixing buses, causing data outputted from the plurality of mixer input channels or the mixed data outputted from the mixing buses to be selectively inputted to at least designated one of the tracks of the multi-track recorder, displaying a first setting display showing selection settings for selective input of the data inputted to the external input terminals to the at least designated one of the mixer input channels, a second setting display showing selection settings for selective input of the data from the mixer input channels to the designated least one of the tracks, and an execution button, changing contents of the first setting display and contents of the second setting display, according to user's instructions, and changing the selection settings for the selective input of the data inputted to the external input terminals to the at least designated one of the mixer input channels based on the changed contents of the first setting display, and the selection settings for the selective input of the data from the mixer input channels to the designated least one of the tracks based on the changed contents of the second setting display, in response to user's operation of the execution button.

Further, the fifth aspect of the invention also provides a recording/reproducing program executed by a computer, the program using a multi-track digital recording/reproducing apparatus for recording and reproducing digital audio data by using multiple tracks, the apparatus including a multi-track recorder that is capable of performing recording and reproduction of data on a plurality of tracks, a plurality of external input terminals that are capable of receiving data from at least one external device, a plurality of mixer input channels that control characteristics of data inputted thereto and output the data, and a plurality of mixing buses that each mix data inputted thereto and output the mixed data, the program comprising a first selection module that causes data inputted to the external input terminals to be selectively inputted to at least designated one of the mixer input channels, a second selection module that causes data outputted from each of the tracks of the multi-track recorder to be selectively inputted to at least designated one of the mixing buses, a third selection module that causes the data outputted from each of the mixer input channels to be selectively inputted to at least designated one of the mixing buses, a fourth selection module that causes data outputted from the plurality of mixer input channels or the mixed data outputted from the mixing buses to be selectively inputted to at least designated one of the tracks of the multi-track recorder, a display module that displays a first setting display showing selection settings by the first selection module for selective input of the data inputted to the external input terminals to the at least designated one of the mixer input channels, a second setting display showing selection settings by the fourth selection module for selective input of the data from the mixer input channels to the designated least one of the tracks, and an execution button, a display changing module that changes contents of the first setting display and contents of the second setting display, according to user's instructions, and a selection settings-changing module that changes the selection settings by the first selection module based on the changed contents of the first setting display, and the selection settings by the fourth selection module based on the changed contents of the second setting display, in response to user's operation of the execution button.

According to this multi-track digital recording/reproducing apparatus, method and program of the fifth aspect of the invention, it is possible to collectively set the recording paths from the external input terminals through the mixer input channels to a plurality of tracks in a centralized manner on a single screen view. In the operation of this collective centralized setting, direct paths from the mixer input channel to the recorder are used, and hence it is not required to assign mixing buses to the mixer input channels. Therefore, control of mixing or configuration of the apparatus is facilitated, and connections after the setting operation can be easily grasped by the user.

The above and other objects, features, and advantages of the invention will become more apparent from the following detailed description taken in conjunction with the accompanying drawings.

BRIEF DESCRIPTION OF THE DRAWINGS

FIGS. 9A and 9B shows how reproducing tracks are automatically muted in response to designation of recording tracks.

DETAILED DESCRIPTION OF THE PREFERRED EMBODIMENT

The present invention will now be described in detail with reference to the drawings showing an embodiment thereof.

Figure 1:
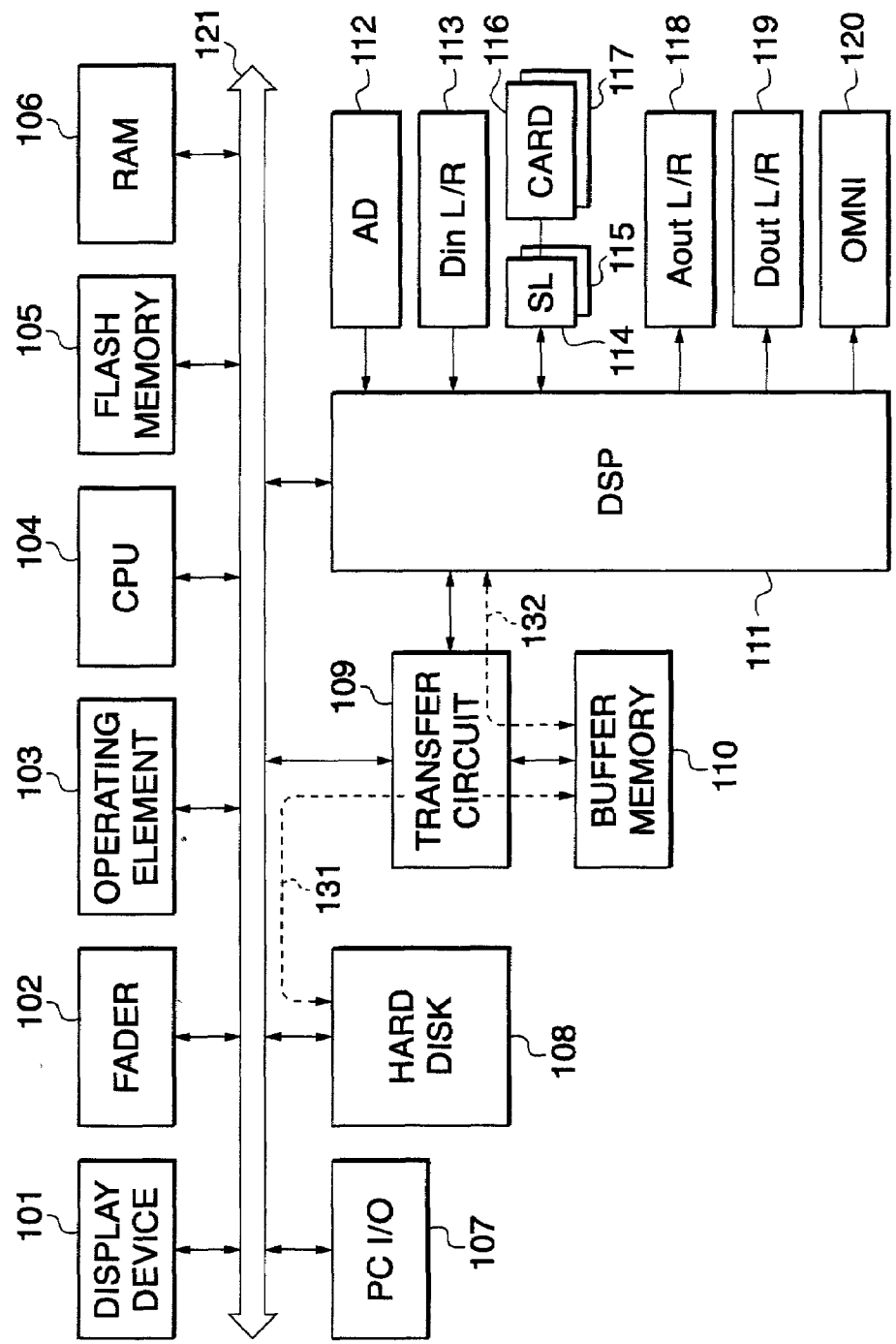
FIG. 1 is a block diagram showing the whole arrangement of a multi-track digital recording/reproducing apparatus having a mixing function according to an embodiment of the present invention.

Referring first to FIG. 1, there is shown the whole arrangement of a multi-track digital recording/reproducing apparatus having a mixing function according to an embodiment of the present invention. The apparatus is comprised of a display device 101, a fader 102, an operating element group 103, a central processing unit (CPU) 104, a flash memory 105, a random access memory (RAM) 106, an input/output (I/O) interface 107 for interfacing with a personal computer, a hard disk (HD) 108, a transfer circuit 109, a buffer memory 110, a digital signal processor (DSP) 111, and a bus line 121. Further, the apparatus includes external connection terminals, such as an analog input (AD) 112, a digital input (Din L/R) 113, slots (SL) 114, 115, an analog output (Aout L/R) 118, a digital output (Dout L/R) 119, and an omni-output (OMNI) 120.

The analog input (AD) 112 represents analog audio data input terminals (eight terminals). Analog audio data received via each of the terminals is converted to digital data by an analog-to-digital converter, not shown, and then inputted to the DSP 111. The digital input (DIN L/R) 113 represents input terminals for receiving 2-channel stereo digital audio data. The analog output (Aout L/R) 118 represents external terminals for outputting analog signals obtained by converting 2-channel stereo output from the DSP 111 by a digital-to-analog converter, not shown. The digital output (Dout L/R) 119 represents digital data output terminals for outputting the 2-channel stereo output from the DSP 111. The omni-output (OMNI) 120 represents digital data output terminals for outputting 4-channel digital data from the DSP 111.

The slots (SL) 114, 115 represent two slots provided in the present apparatus. Each of the slots (SL) 114, 115 can receive various option cards. In FIG. 1, a card 116 is inserted in the slot 114, and another card 117 in the slot 115. As the cards 116, 117, there may be used e.g. an analog-to-digital conversion card for analog input, a digital I/O card, and a digital-to-analog conversion card for analog output. By inserting these cards, it is possible to increase input/output terminals for external connection.

The display device 101 is a display (such as a liquid crystal display device) for displaying various kinds of information. The fader 102 is a slide volume-type operating element for carrying out volume level adjustment of input or output channels assigned as required. The operating element group 103 includes various kinds of switches. The CPU 104 controls the overall operation of the apparatus. The flash memory 105 stores control programs and the like which are executed by the CPU 104. The RAM 106 is used e.g. as an area for loading recording and reproduction information from the HD 108, which is referred to by the CPU 104, and used as a work area as well. The I/O interface 107 provides an interface for connection with a personal computer (PC). The hard disk (HD) 108 is an external storage device for storing various kinds of data such as the recording and reproduction information, and particularly includes an area for recording digital audio data. The buffer memory 110 temporarily stores data to be recorded/reproduced when recording/reproduction is carried out by using the HD 108. The digital signal processor (DSP) 111 performs mixing processing for mixing audio data, effect-imparting processing, and so forth, as described in detail hereinafter.

The transfer circuit 109 controls data transfer 131 between the HD 108 and the buffer memory 110 and data transfer 132 between the DSP 111 and the buffer memory 110, in response to instructions from the CPU 104. Recording and reproduction of audio data onto and from the HD 108 are performed by using multiple tracks (the term "track" used here represents the notion of an audio data series for recording and reproduction, but not one of physical or mechanical storage areas concentrically arranged on a hard disk). A basic operation of the transfer circuit 109 for one-track data recording is performed in the following manner: (1) one sample of data for recording from the DSP 111 is received and written into the buffer memory 110 every sampling period; (2) when one cluster of data samples are accumulated in the buffer memory 110, the data samples are transferred to a storage area of the HD 108 for the track; and (3) the operation (1) is carried out continuously even during the operation (2). On the other hand, a basic operation of the transfer circuit 109 for one-track data reproduction is performed in the following manner: (1) data samples of two or more leading clusters for the track are read from the HD 108 and written into the buffer memory 110; (2) one sample is read from the buffer memory 110 and delivered to the DSP 111 every sampling period; and (3) when a vacant area (i.e. the area that stored the reproduced samples) for one cluster of samples occurs in the buffer memory 110, data of the following one cluster is transferred to the vacant area from the HD 108. It should be noted that the term "cluster" represents a minimum logical unit of data to be read from or written into the HD 108.

Figure 2:
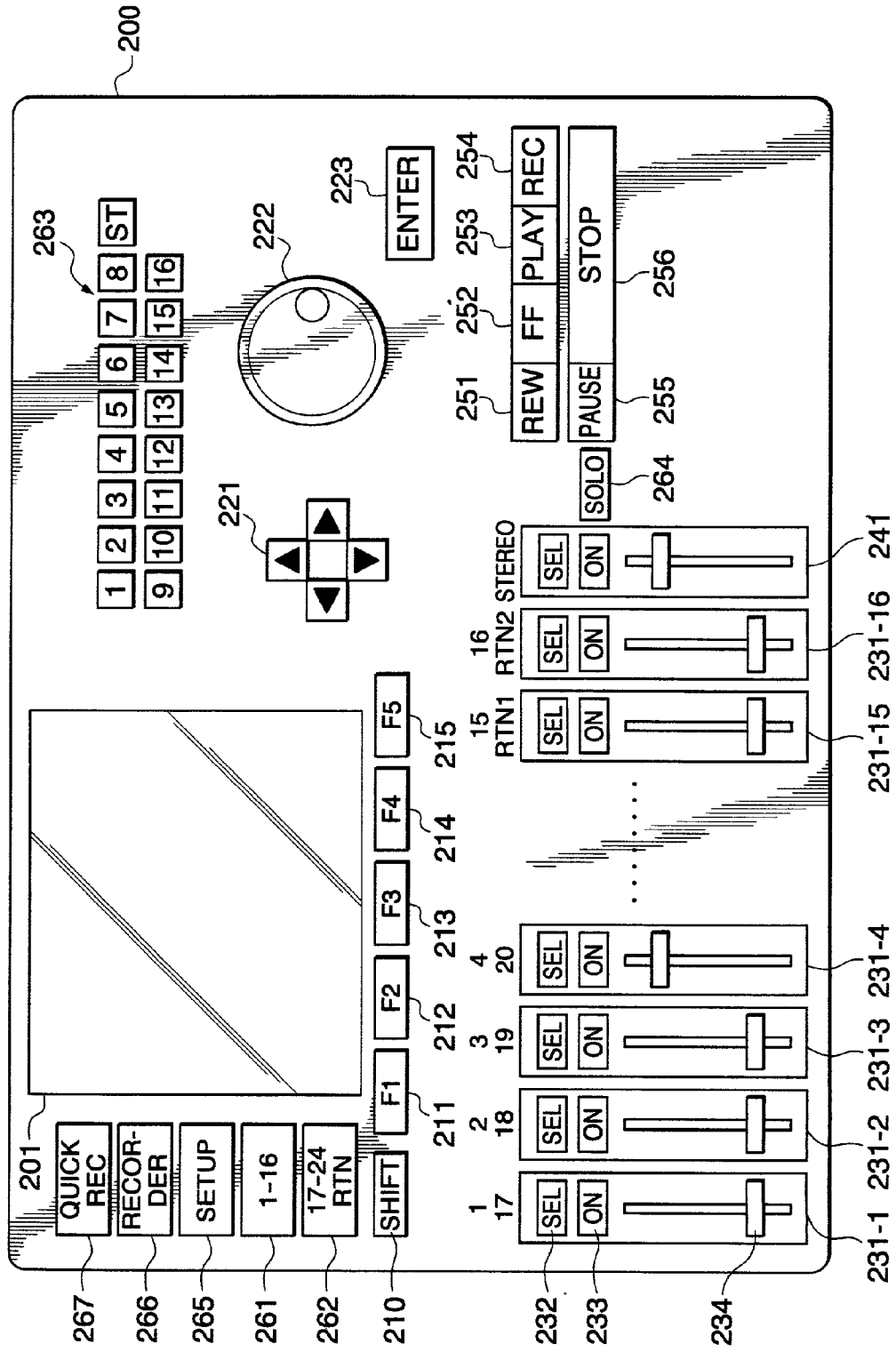
FIG. 2 is a view schematically showing the appearance of a panel of the FIG. 1 apparatus.

FIG. 2 shows the appearance of a panel of the FIG. 1 apparatus. The display device 101, the fader 102 and the operating element group 103, all appearing in FIG. 1, are arranged on the panel. Reference numeral 201 designates a display 201 corresponding to the display device 101 in FIG. 1. Reference numeral 210 designates a shift key, and reference numerals 211 to 215 designate function keys F1 to F5. Reference numeral 221 designates a cursor-moving key for use in moving a cursor displayed on the display 201, and reference numeral 223 an enter key. Further, reference numeral 222 designates a value-entering operating element (data input dial) for use in changing values set for various data.

Reference numerals 231-1 to 231-16 designate respective operating element sets to be assigned to predetermined mixer input channels, described hereinafter, for controlling the assigned mixer input channels. Each mixer input channel represents a channnel for a series of data to be input to mixing buses that perform mixing. The apparatus has twenty-four mixer input channels 1 to 24, which will be described in detail hereinafter with reference to FIG. 3. In the operating element set 231-1, reference numeral 232 designates a SEL key for use in displaying a screen view associated with the corresponding mixer input channel to provide instructions for various settings (adjustment of frequency characteristics, control of a compressor and a pan, etc.). Further, reference numeral 233 designates an ON key for switching on/off the mixer input channel, and reference numeral 234 a fader (slide volume-type operating element) for adjusting the volume level. The SEL key 232 and the ON key 233 are switches of a light emitting type which are lit when depressed into a selected state and extinguished when depressed again into a non-selected state. When a 1-16 ch (channel) selection key 261 is depressed, the operating element set 231-1 is assigned to the mixer input channel 1 and operates as an operating element set for controlling the mixer input channel 1. Alternatively, when a 17-24 ch (channel) selection key 262 is depressed, the operating element set 231-1 is assigned to the mixer input channel 17 and operates as an operating element set for controlling the mixer input channel 17. To indicate these corresponding mixer input channels to be controlled, numeric characters "1" and "17" are printed above the operating element set 231-1.

On the right side of the operating element set 231-1, there are arranged operating element sets 231-2 to 231-16 each formed similarly to the operating element set 231-1. Printed above each of the operating element sets 231-2 to 231-16 are numeric characters that each indicate a mixer input channel to be controlled thereby when the 1-16 ch (channel) selection key 261 or the 17-24 ch (channel) selection key 262 is depressed or turned on. In this connection, the operating element sets 231-15 and 231-16 have characters "RTN1" and "RTN2", respectively, printed above them at locations below respective numeric characters "15" and "16". This means that when the 17-24 ch selection key 262 is depressed, the operating element sets 231-15 and 231-16 are each assigned to a 2-channel effect return channel (designated by reference numeral 313 in FIG. 3, referred to hereinafter) as an operating element set for controlling the same. Further, reference numeral 241 designates an operating element set for controlling the whole 2-channel stereo output.

Reference numeral 264 designates a SOLO key. When the SOLO key 264 is turned on (whereby the key top is lit), if one of the ON keys 233 for the respective selected channels is turned on, a sound is outputted only from a corresponding one of the channels. A REW key 251, an FF key 252, a play key 253, a REC key 254, a PAUSE key 255, and a STOP key 256 are for giving respective instructions for rewind, fast-forward, reproduction, recording, pause, and stop.

Figure 10:
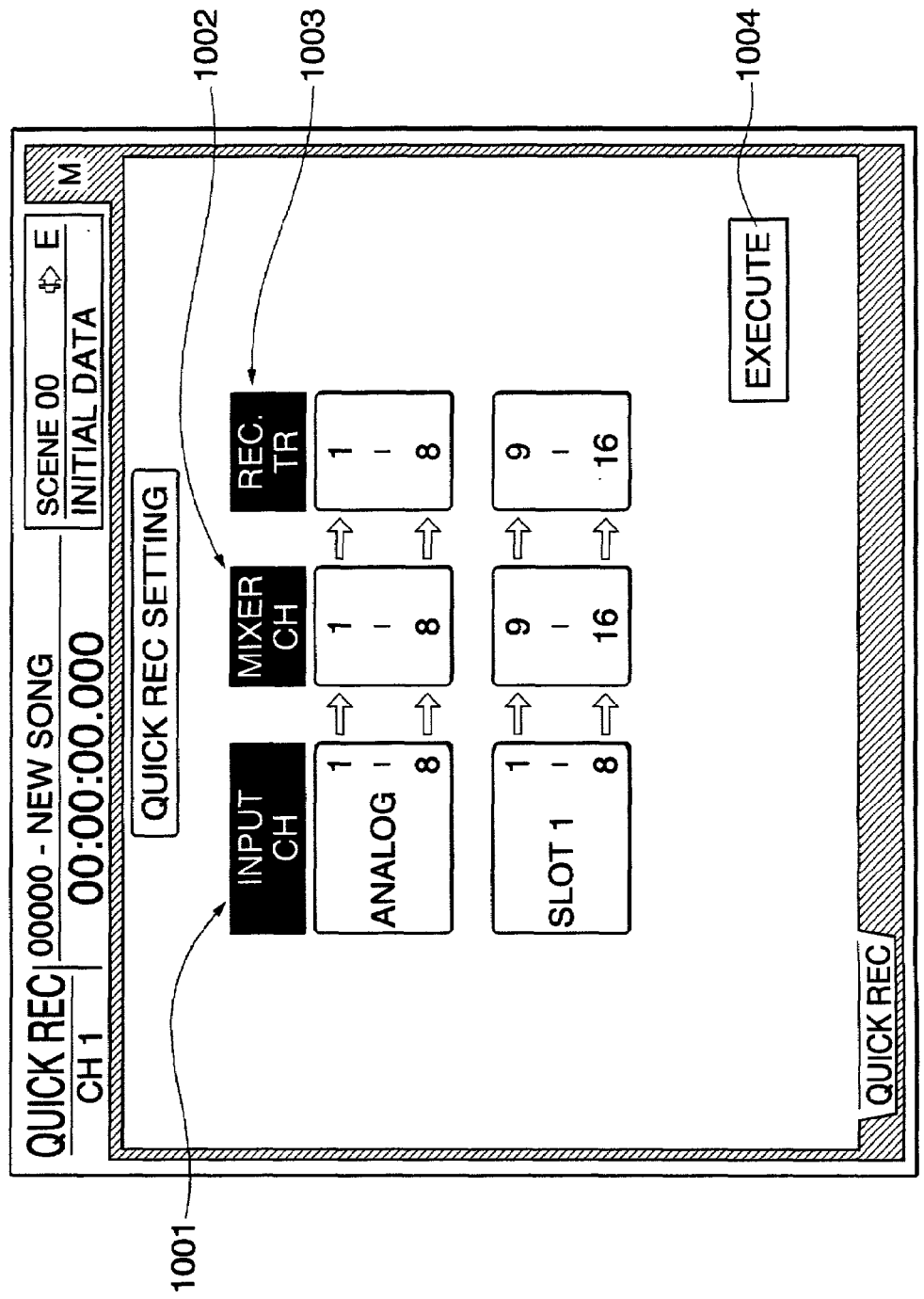
FIG. 10 shows an example of a screen view of the display screen showing a QUICK REC screen.

Reference numeral 263 designates a group of recording track switches for selecting respective tracks to be recorded. When one of the switches with the numeric characters "1" to "16" printed thereon, respectively, is turned on, a track having the corresponding track number enters a recording enabled state. Reference numeral 265 designates a SETUP key. By turning on the SETUP key 265, it is possible to set patching between input and output, which will be described hereinafter. Reference numeral 266 designates a RECORDER key. By turning on the RECORDER key 266, it is possible to perform adjustment of frequency characteristics, control of the compressor and the pan (by the SEL key), and adjustment of a sound level (by the fader) concerning a signal to be inputted to a recorder channel 320, described hereinafter with reference to FIG. 3, using the operating element sets 231-1 to 231-16 in FIG. 2. Reference numeral 267 designates a QUICK REC key. When the QUICK REC key 267 is turned on, a QUICK REC screen view, described hereinafter with reference to FIG. 10, is displayed, which facilitates execution of a plurality of assignments.

Figure 3:
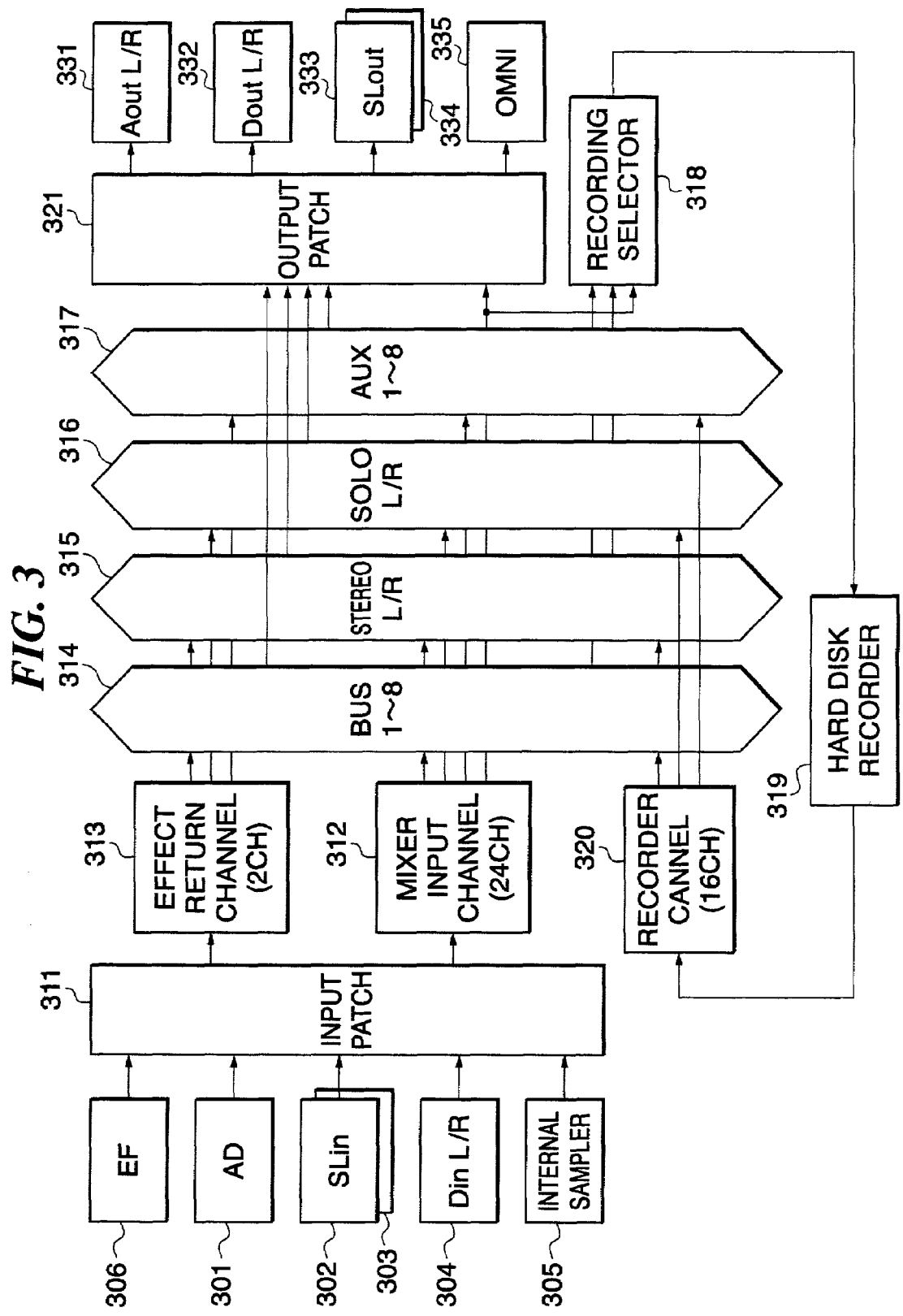
FIG. 3 is a block diagram showing the outline of mixing processing.

FIG. 3 shows the outline of mixing processing implemented by the DSP 111. Reference numerals 301 to 306 designate inputs for mixing processing. An AD 301 represents inputs of eight channels digitized from respective eight analog inputs (AD 112 in FIG. 1). Slin's 302, 303 represent inputs inputted via input option cards inserted in the two slots (SL 114, SL 115 in FIG. 1), respectively. In the present apparatus, a card capable of receiving maximum eight channels of inputs can be used, which means that inputs of maximum 16 channels can be received via the two slots. A Din L/R 304 represents 2-channel stereo digital inputs (Din L/R 113 in FIG. 1).

An internal sampler 305 represents inputs of eight channels of an internal waveform memory sound source, not shown. Each channel of the internal waveform memory sound source is capable of storing a desired musical tone waveform and generating a musical tone having the waveform, as required, when a predetermined switch therefor is depressed. For example, it is possible to store an effect sound, such as clapping of hands, in a channel thereof and generate the sound when necessary.

An EF 306 represents two series of 2-channel stereo inputs from an external effector (effect-imparting device), not shown. The present apparatus is capable of inputting digital audio data taken from 1st to 6th channels of AUX buses, described hereinafter, to the external effector to impart effects thereto, and then returning the digital audio data imparted with the effects to inputs of the mixing processor. The EF 306 represents the effect inputs thus made. It should be noted that the DSP 111 also functions as an internal effector, not shown in FIG. 3, so that it is also possible to input digital audio data taken from 7th and 8th channels of the AUX buses, described hereinafter, to the external effector to impart effects thereto, and then return the resultant data to the mixing processor via the EF 306.

Thus, thirty channels of external inputs (eight channels of analog inputs, two channels of digital inputs, 8×2 channels of inputs from the option cards inserted into the slots, and 2×2 channels of inputs from the effect return channels) and eight channels of internal inputs (eight channels of inputs from the internal samplers) are inputted for mixing processing.

Reference numerals 331 to 335 designate outputs subjected to the mixing processing. An Aout L/R 331 represents 2-channel stereo analog outputs (corresponding to the Aout L/R 118 in FIG. 1), while an Dout L/R 332 represents 2-channel stereo digital outputs (corresponding to the Dout L/R 119 in FIG. 1). Further, Slout's 333, 334 represent respective outputs from option cards for data output inserted in the respective two slots. In the present apparatus, it is possible to insert a card capable of delivering maximum eight channels of outputs into each slot, and therefore outputs of maximum 16 channels can be delivered via the two slots. An OMNI 335 represents digital outputs of four channels (corresponding to the OMNI 120 in FIG. 1).

Reference numerals 314 to 317 designate mixing buses for performing mixing processing. Reference numeral 314 designates 8-channel general-purpose buses (for use in recording and reproduction) which are denoted as BUS1 to BUS8. Reference numeral 315 designates 2-channel stereo recording/reproduction buses which are denoted as Stereo_L/R. Reference numeral 316 designates 2-channel stereo solo buses (for use in reproduction) which are denoted as Solo_L/R. Further, reference numeral 317 designates AUX buses (for use in reproduction) which are denoted as AUX1 to AUX8.

Reference numeral 312 designates mixer input channels. The mixer input channels represent channels for series of data to be input to the mixing buses 314 to 317 that carry out mixing processing. The mixer input channels 312 include 24 channels in total. By assigning the operating element sets 231-1 to 231-16, described hereinbefore with reference to FIG. 2, to the mixer input channels 312, it is possible to carry out adjustment of frequency characteristics, control of the compressor and the pan, etc. (by the SEL key appearing in FIG. 2), and adjustment of a sound level (by the fader appearing in FIG. 2).

As illustrated by arrows extending from the mixer input channels 312 to the mixing buses 314 to 317, each mixer input channel can be selectively connected to a desired one of the mixing buses. In particular, it is possible to selectively output a signal subjected to channel level control by a fader, from each mixer input channel to any one of the eight general-purpose buses BUS1 to BUS8 and the two stereo recording buses Stereo_L/R. It is also possible to output a signal before being subjected to channel level control, from each mixer input channel to the two solo buses Solo_L/R. Further, it is possible to output a signal subjected to AUX level control after channel level control, from each mixer input channel to the eight AUX buses AUX1 to AUX8. First 16 channels of the 24 channels of the mixer input channels 312 have respective direct-out connections for directly outputting signals to 16 tracks of an internal recorder, respectively. An arrow extending from the mixer input channels 312 to a recording selector 318, hereinafter referred to, designates the direct-out connections. In each direct-out connection, a signal is inputted from an n-th input channel to an n-th track, which means that n input channels are in one-to-one correspondence with the n tracks. Further, signals can be delivered from the mixer input channels to the output terminals 331 to 335 via an output patch 321, described hereinafter.

The effect return channels 313 receive signals returned from the 2-channel external effector or the 2-channel internal effector. By assigning the operating element sets 231-15, 231-16, described with reference to FIG. 2, to the respective effect return channels 313, it is possible to carry out adjustment of frequency characteristics, control of the compressor and the pan, etc. (by the SEL keys appearing in FIG. 2) and adjustment of a volume level (by the faders appearing in FIG. 2). As illustrated by arrows extending from the effect return channels 313 to the respective mixing buses 314 to 317 in FIG. 3, the effect return channels can be connected to desired ones of the mixing buses.

Any one of the 38 inputs in total of the external inputs (301 to 304, 306) of maximum 30 channels and the internal inputs (305) of 8 channels can be selectively assigned to the mixer input channels 312 and the effect return channels 313. An input patch 311 carries out the assignment. A screen view displayed for use in carrying out the assignment by the input patch 311 will be described hereinafter with reference to FIG. 4.

An HD recorder 319 is an internal recorder capable of 16-track recording/16-track reproduction. Data can be selectively inputted to each track as a recording input from any one of 26 channels in total of the eight channnels of the general-purpose buses BUS1 to BUS8, the 16 channels of direct-out connections from the mixer input channels 312, and the two channels of the stereo recording/reproduction buses Stereo_L/R. The assignment is carried out by a recording selector 318. A screen view displayed for use in carrying out the assignment by the recording selector 318 will be described hereinafter with reference to FIG. 4.

A reproduced output from each track of the HD recorder 319 is supplied to a corresponding one of the recorder channels 320 arranged in a manner corresponding to the 16 tracks of the internal recorder. By turning on the RECORDER key 266 in FIG. 2, each recorder channel 320 can carry out adjustment of frequency characteristics, control of the compressor and the pan, etc. (by the SEL key appearing in FIG. 2), and adjustment of a volume level (by the fader appearing in FIG. 2) concerning a signal to be inputted. Each recorder channel is supplied with a recording input for recording a corresponding track (when data reproduced from the HD recorder 319 is returned to one of the recording buses for recording) or a reproducing output for reproduction of a corresponding track. Further, it is possible to selectively output a signal subjected to channel level control by the fader, from each recorder channel 320 to one of the eight general-purpose buses BUS1 to BUS8 and the two stereo recording buses Stereo_L/R. It is also possible to selectively output a signal before being subjected to channel level control, from each recorder channel 320 to one of the two solo buses Solo_L/R. Further, it is possible to selectively output a signal subjected to AUX level control after channel level control, from each recorder channel to one of the eight AUX buses AUX1 to AUX8.

From each of the mixing buses 314 to 317 and the mixer input channels 312, data can be selectively outputted to one of the output terminals 331 to 335. The assignment is performed through the mechanism of the output patch 321. A screen view displayed for use in carrying out the assignment by the output patch 321 will be described hereinafter with reference to FIG. 5.

Figure 4:
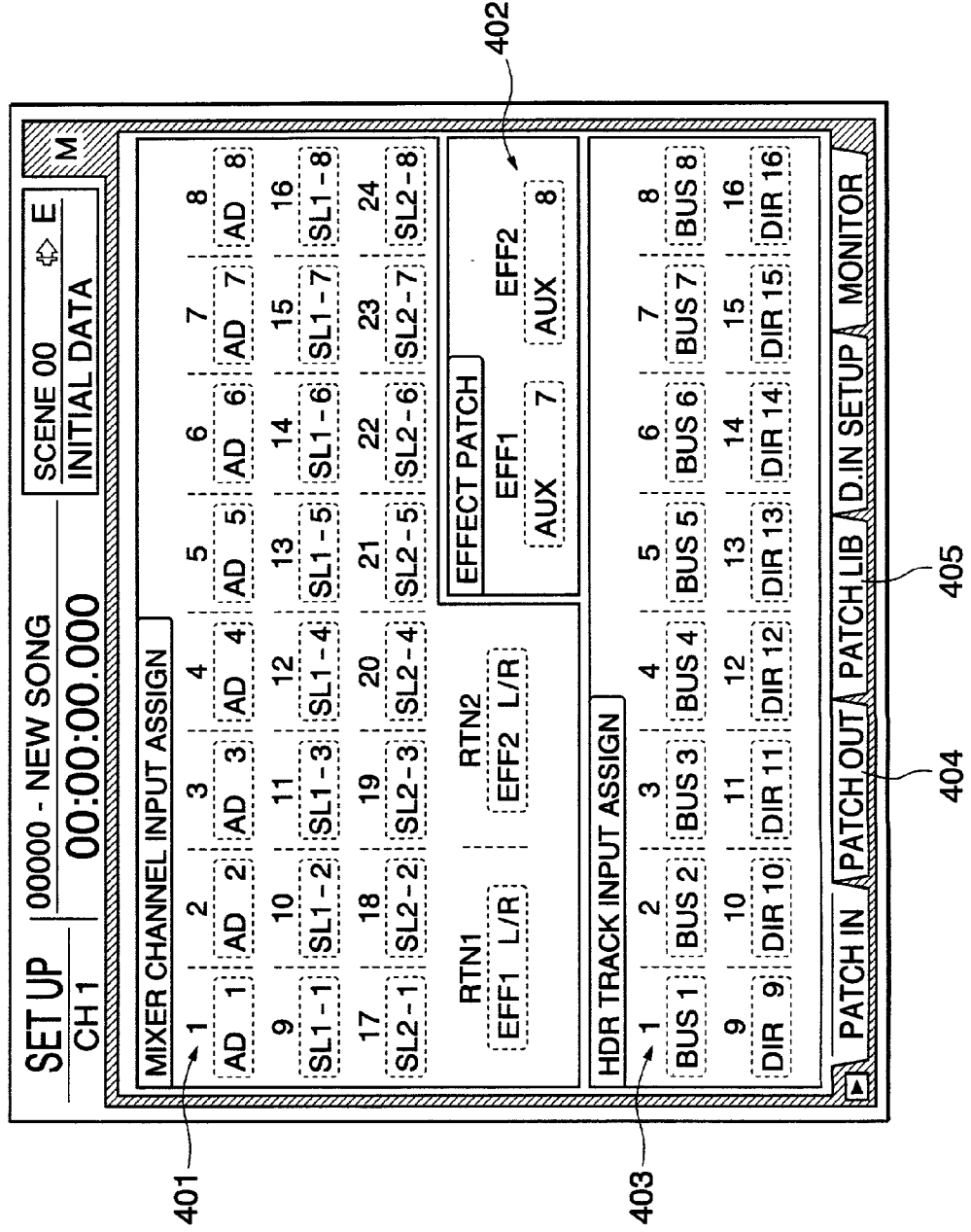
FIG. 4 shows an example of a screen view of a display screen for use in carrying out assignment by an input patch and assignment by a recording selector.

FIG. 4 shows an example of the screen view via which the assignment by the input patch 311 or the recording selector 318 is carried out. The screen view is displayed by turning on the SETUP key 265 in FIG. 2.

In FIG. 4, "MIXER CHANNEL INPUT ASSIGN" designated by reference numeral 401 denotes an area from which instructions are given as to which of the inputs 301 to 306 should be assigned to each of the mixer input channels 1 to 24 and the effect return channels 313. Numeric characters "1" to "24" displayed in this order represent the mixer input channels 1 to 24, respectively. Inputs assigned to the respective mixer input channels are indicated as "AD1", "AD2", . . . "SL1-1", "SL1-2", "SL2-1", "SL2-2", . . . , which are displayed under the respective numeric characters "1" to "24". "AD1", "AD2", . . . represent a first channel, a second channel, . . . of the analog inputs AD 301. "SL1-1", "SL1-2", . . . represent a first channel, a second channel, . . . of the inputs Slin 302 from the option card inserted in the slot 1, while "SL2-1", "SL2-2", . . . represent a first channel, a second channel, . . . of the inputs Slin 303 from the option card inserted in the slot 2. Further, "RTN1" and "RTN2" represent inputs assigned to the respective effect return channels 313. "EFF1 L/R" and "EFF1 L/R" assigned respectively to "RTN1" and "RTN2" represent the effect inputs EF 306 assigned to the respective effect return channels 313.

"EFFECT PATCH" designated by reference numeral 402 denotes an area for displaying inputs assigned to the respective internal effectors. "EFF1" and "EFF2" represent the internal effectors. In the illustrated example, "EFF1" and "EFF2" are assigned to the AUX buses AUX7 and AUX8, respectively, such that data is inputted into the effectors via the AUX buses AUX7 and AUX8.

"HDR TRACK INPUT ASSIGN" designated by reference numeral 403 denotes an area for displaying inputs assigned by the recording selector 318. Numeric characters "1" to "16" displayed in this order represent the 16 tracks, respectively. Inputs assigned to the respective tracks are indicated as "BUS1", "BUS2", . . . "DIR1", "DIR2", . . . , which are displayed under the respective numeric characters "1" to "16". "BUS1", "BUS2", . . . represent the inputs from the general-purpose buses BUS1 to BUS8, while "DIR1", "DIR2", . . . represent the inputs from the direct-out connections of the respective mixer input channels 312.

The FIG. 4 screen view enables setting of input sources for the mixer input channels 312, the internal effectors and the tracks of the HD recorder 319. For example, in setting an input source for an input channel, the cursor is moved by using the cursor-moving key 221 to an area displaying the desired input channel, and then by operating the value-entering operating element (data input dial) 222, input sources available for the input channel are sequentially displayed so as to allow the user to select a desired input source. It goes without saying that the external inputs from the slots are each selectable as an input source only when at least one input card is inserted in any of the slots.

Figure 5:
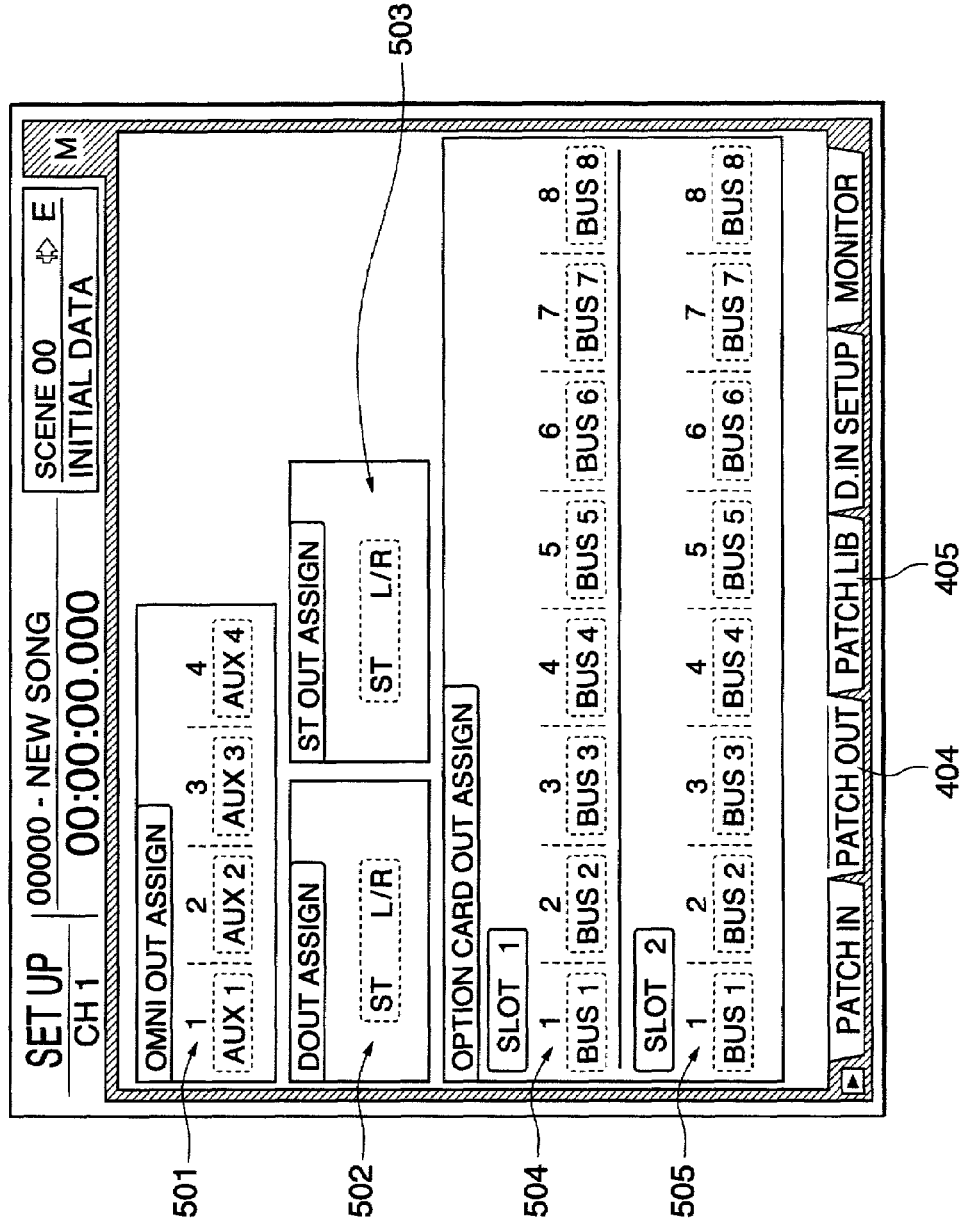
FIG. 5 shows an example of a screen view of the display screen for use in carrying out assignment by an output patch.

FIG. 5 shows an example of the screen view from which the assignment by the output patch 321 is carried out. The screen view is displayed by specifying a page designated by reference numeral 404 in FIG. 4.

In FIG. 5, "OMNI OUT ASSIGN" designated by reference numeral 501 denotes an area displaying a status of assignment effected for the omni output OMNI335. In the illustrated example, the buses AUX1 to AUX4 of the AUX buses 317 are assigned to four digital output terminals of the omni output OMNI335, respectively, as input sources for the same. "DOUT ASSIGN" designated by reference numeral 502 denotes an area displaying a status of assignment effected for the 2-channel stereo digital outputs Dout L/R 332. In the illustrated example, the 2-channel stereo recording/reproduction buses Stereo_L/R 315 are assigned to the stereo digital outputs Dout L/R 332 as input sources for the same. "ST OUT ASSIGN" designated by reference numeral 503 denotes an area displaying a status of assignment effected for the 2-channel stereo analog outputs Aout L/R 331. In the illustrated example, the 2-channel stereo recording/reproduction buses Stereo_L/R 315 are assigned to the stereo analog outputs Aout L/R 331 as input sources for the same. "SLOT1" designated by reference numeral 504 and "SLOT2" designated by reference numeral 505 denote areas displaying respective statues of assignment effected for the option cards (output cards) inserted in the slots 1 and 2, respectively. In the illustrated example, the general-purpose buses BUS1 to BUS8 are assigned to each of the option cards as input sources for the same.

The FIG. 5 screen view enables setting of input sources for the output terminals. For example, in setting an input source for an output terminal, the cursor is moved by using the cursor-moving key 221 to an area displaying the desired output terminal, and then by operating the value-entering operating element (data input dial) 222, input sources available for the output terminal are sequentially displayed so as to allow the user to select a desired input source. It goes without saying that setting of input sources for an output card is possible only when at least one output card is inserted in any of the slots.

Figure 6:
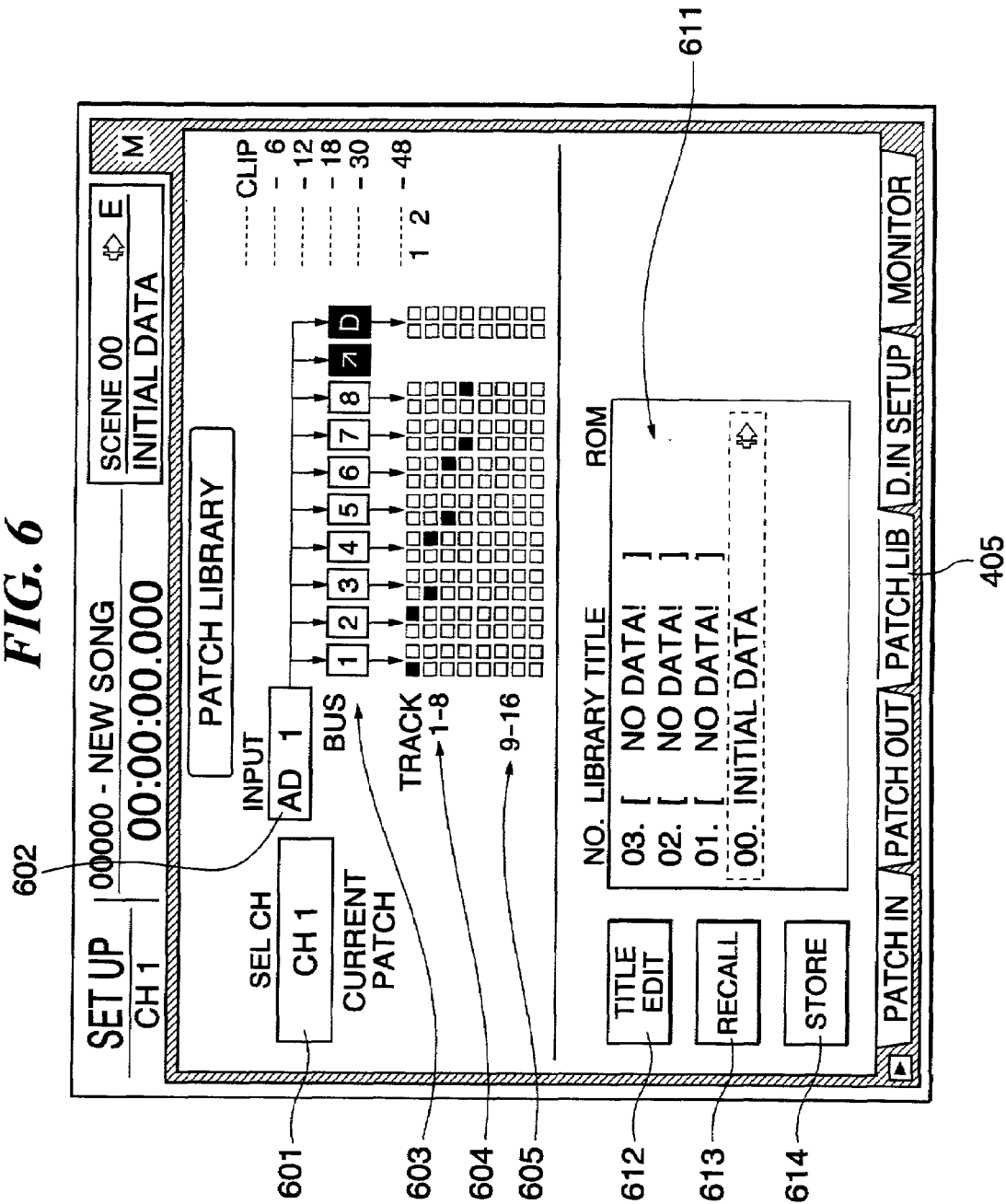
FIG. 6 shows an example of a screen view of the display screen which enables a user to grasp a patching status for recording (status of assignment of each channel) at a glance.

FIG. 6 shows a display screen view which enables the user to grasp a patching status for recording (status of assignment of each channel) at a glance. This screen view is displayed by specifying a page designated by reference numeral 405 in FIG. 4 or 5.

In FIG. 6, "SEL CH" designated by reference numeral 601 denotes an area indicating which channel is currently displayed. In the illustrated example, "CH1" is displayed, so that the user can understand that the present screen concerns the mixer input channel 1. By moving the cursor to the area displaying "SEL CH" and operating the data input dial 222, the user can select one of the 24 mixer input channels 312 and the 2 effect return channels 313. Alternatively, the user can also select a desired channel by depressing the SEL key of any of the operating element sets 231-1 to 231-16 and 241 in FIG. 2.

"INPUT" designated by reference numeral 602 denotes an area displaying an input source for the channel. In the illustrated example, "AD1" is displayed, and hence the user can understand that the present input source for the mixer input channel 1 is the analog input AD1. "BUS" designated by reference numeral 603 denotes an area displaying an output destination of data from the channel. In the illustrated example, boxed numeric characters "1" to "8" indicate respective statuses of output from the channel to the buses BUS1 to BUS8 of the general-purpose buses 314. A boxed symbol "ST" indicates a status of output from the channel to the stereo recording buses Stereo_L/R 315, while a boxed symbol "D" indicates a status of output by a direct-out connection from the channel. The symbols "ST" and "D" are displayed in reverse video to indicate that they are designated as output destinations for data output. Therefore, the FIG. 6 example shows that data is outputted from the mixer input channel 1 to the stereo recording buses Stereo_L/R 315 and the direct-out connection. It should be noted that the direct-out connection to the internal recorder is always in the ON or selected state, because the recorder can determine whether or not to accept direct output from the mixer input channel. Further, the solo buses Solo_L/R 316 and the AUX buses 317 are not displayed as output destinations since they are not recording buses.

"TRACK1-8" designated by reference numeral 604 and "TRACK9-16" designated by reference numeral 605 denote a state of connection for a recording output, between each bus and each track of the recorder. Small rectangles represent the respective tracks. Tracks displayed in reverse video indicate that they are set to receive outputs from respective corresponding buses.

The FIG. 6 screen view enables the user to comprehend at a glance from which source data is received, through which bus the data is sent, and on which track the data is recorded. Further, the user can change settings in the areas "INPUT" and "BUS", via this screen view. However, data of settings for the recording output destinations TRACK cannot be changed via the present screen view.

Reference numeral 611 designates a list of names of files storing the respective patching statuses described above. A STORE button 614 allows the present settings to be stored in a file with a file name assigned thereto. A RECALL button 613 allows the patching status stored in the file to be loaded (read and reproduced). A TITLE EDIT button 612 allows the file name of the file to be changed.

Figure 7:
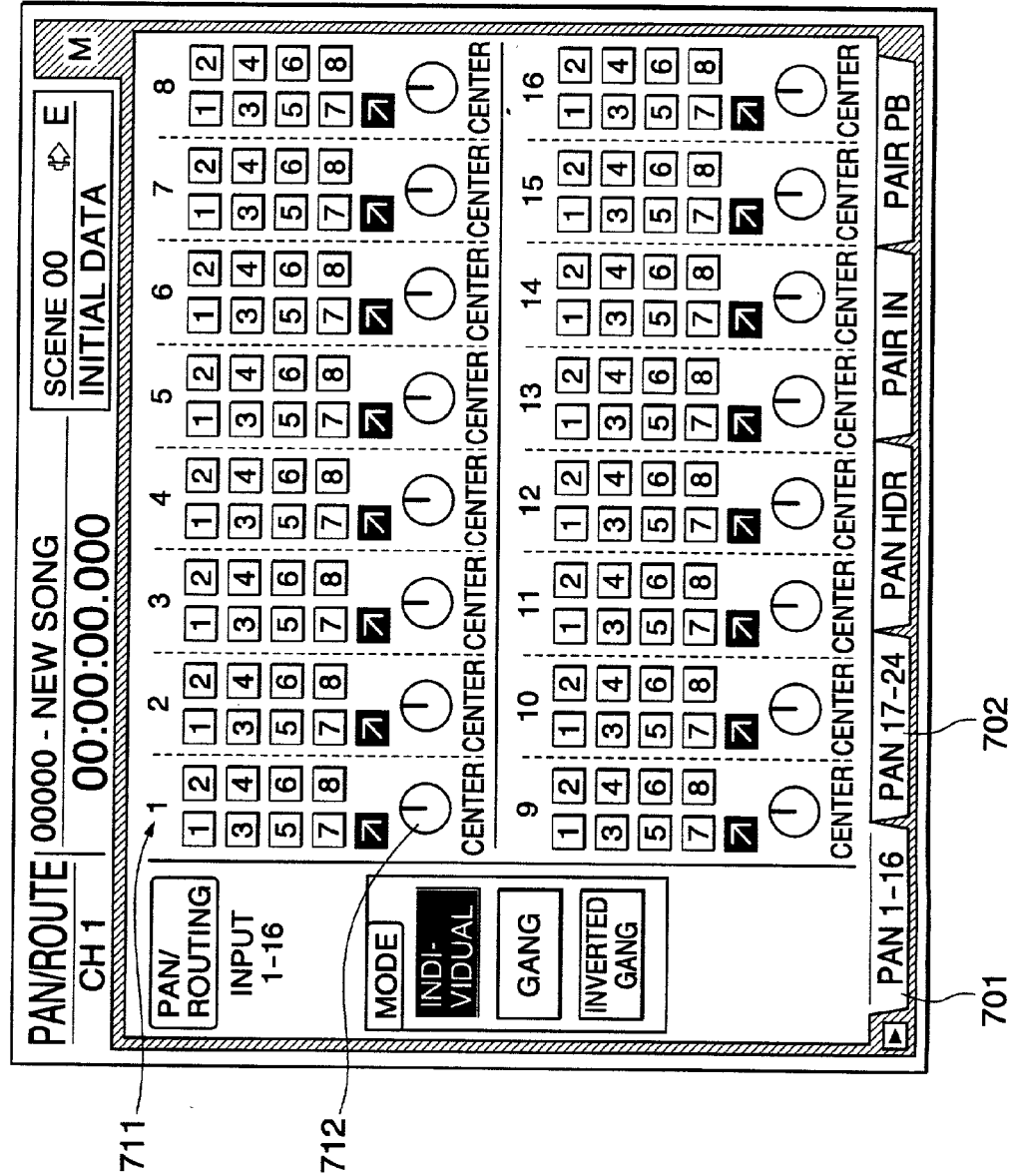
FIG. 7 shows an example of a screen view of the display screen showing from which input channel to which general-purpose bus data is outputted.

FIG. 7 shows a screen view showing to which of the general-purpose buses BUS1 to BUS8 each of the input channels (mixer input channels) is set for outputting data. A page 701 is an image displayed in association with the input channels 1 to 16, while a page 702 is an image displayed in association with the input channels 17 to 24. Reference numeral 711 designates a display area concerning the input channel 1, which shows a status of assignment of output from the input channel 1 to the general-purpose buses BUS1 to BUS8 and the stereo recording buses Stereo_L/R. Boxed numeric characters "1" to "8" represent the respective general-purpose buses BUS1 to BUS8, and a boxed symbol "ST" the stereo recording buses Stereo_L/R. When any one of them is displayed in reverse video, it indicates that the output from the input channel 1 is assigned to the bus. Reference numeral 712 designates settings for a pan (left-right localization) of the input channel 1. The above settings can be changed via the present screen view.

As described above, in the apparatus of the present embodiment, inputs from another device or the like (i.e. mixer input channels) and inputs of signals generated by the recorder (i.e. recorder channels) are discriminated from each other. The mixer input channels are differentiated from the recorder channels in the following points (1) and (2):

(1) Input sources for the mixer input channels can be switched by patching. On the other hand, input sources for the recorder channels are fixedly set to the respective predetermined tracks of the recorder. Since the relationship between the input sources and the tracks is fixed, the user can grasp the state of connections easily.

(2) The mixer input channels 1 to 16 have direct-out connections for outputting signals to the respective recorder tracks 1 to 16 directly (without passing the signals through any mixing buses), whereas the recorder channels have no connections for inputting signals directly into the recorder.

Next, a description will be given of a method of adjusting the number of recording tracks and that of reproducing tracks when recording and reproduction are performed simultaneously by the apparatus of the present embodiment. In a combination apparatus of a digital mixer and a multi-track recorder, such as the present apparatus, there is a case where one part is first recorded, and then another part is recorded while reproducing the one part recorded first. However, in such simultaneous recording and reproduction, if the number of tracks used for simultaneous recording and reproduction is increased, the number of tracks available for the reproduction is reduced. This is due to a limit of processing capability of hardware.

More specifically, the present apparatus carries out processing in a 16-bit mode or in a 24-bit mode. In the 16-bit mode, the bit number of data to be recorded is 16, while in the 24-bit mode, the bit number of data to be recorded is 24. The bit number of sound data of a song once generated can never be changed afterwards. The number of tracks available for simultaneous recording and reproduction depends on whether the bit number of sound data to be recorded is 16 or 24. So long as the bit number is the same, as the number of tracks for simultaneous recording is increased, the number of tracks available for simultaneous reproduction is reduced. In the following, details of the manner of simultaneous recording and reproduction performed by the present apparatus will be described.

In the 16-bit mode, when the number of tracks for simultaneous recording is 0 to 8, all the 16 tracks can be reproduced simultaneously. When the number of tracks for simultaneous recording is 9 to 16, 8 tracks can be then reproduced simultaneously. The 8 tracks for reproduction may be the same tracks as those for recording. Further, if recording is performed on stereo tracks (mixing-down mode), 16 tracks other than the stereo tracks cannot be set for recording, so that all the 16 tracks are used exclusively for reproduction. In other words, all the 16 tracks can be reproduced simultaneously.

In the 24-bit mode, when the number of tracks for simultaneous recording is 0 to 2, all the 16 tracks can be then reproduced simultaneously. When the number of tracks for simultaneous recording is 3 to 4, 12 tracks can be then reproduced simultaneously. When the number of track for simultaneous recording is 5 to 8, 8 tracks can be then reproduced simultaneously. When the number of track for simultaneous recording is 9 to 16, no tracks can be then reproduced simultaneously. Further, if recording is performed on stereo tracks (mixing-down mode), 16 tracks other than the stereo tracks cannot be set for recording, so that all the 16 tracks can be used exclusively for reproduction. In short, all the 16 tracks can be reproduced simultaneously.

Figure 8:
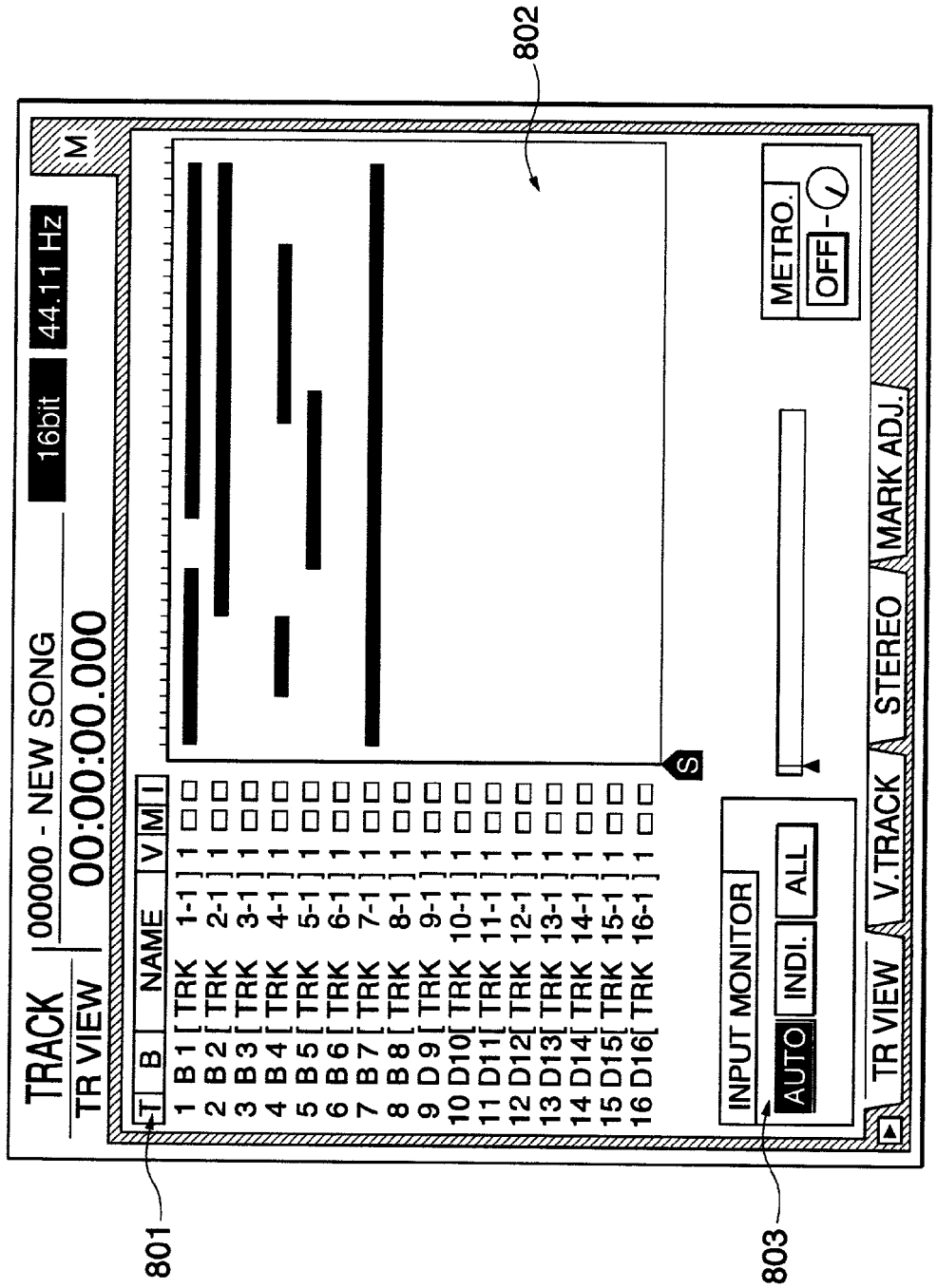
FIG. 8 shows an example of a screen view of the display screen showing a track view screen displayed by a predetermined key operation.

FIG. 8 shows a track view screen displayed by a predetermined key operation. The track view screen displays recording states of a plurality of tracks of the internal recorder. First, a description is given of symbols "T", "B", "NAME", "V", "M" and "I" collectively designated by reference numeral 801. The symbol "T" represents a track number. There are 16 tracks, and hence numeric characters "1" to "16" are displayed in a column below the symbol "T". The track numbers are fixedly set. The symbol "B" represents an input source from which data is inputted to the corresponding track. "B1" represents an input from the general-purpose bus BUS1 (similarly, "Bx" corresponds to an input from "BUSx"), and "D9" a direct input from the input channel 9 (similarly, "Dx" corresponds to a direct input from the input channel x). "NAME" represents a name arbitrarily assigned to the corresponding track. The symbol "V" represents a virtual track number. In the present apparatus, each track has eight virtual tracks, and one of the virtual tracks is selected for use. The symbol "M" represents an ON/OFF state indicative of whether muting of sound data reproduced from each track is carried out. A normally-displayed rectangle (blank rectangle in the figure) indicates a mute-off state, while a rectangle displayed in reverse video indicates a mute-on state. The symbol "I" represents an ON/OFF state of recording of each track. A normally-displayed rectangle (blank rectangle in the figure) indicates the OFF state of recording, while a rectangle displayed in reverse video indicates the ON state of recording. The ON/OFF state of recording of each track can be designated by the recording track switches 263 in FIG. 2.

In a right-hand area 802, the recording status of each track is illustrated in the form of a bar graph. The abscissa represents a time axis. Each bar in the graph indicates existence of data recorded over a time range corresponding to the length of the bar.

Input for each track is selected between recording input from an input channel corresponding to the track and reproduction output from the same. "INPUT MONITOR" designated by reference numeral 803 shows a setting for the selection. "AUTO" is a button for use in carrying out setting for a punch-in. Reproduction output is continuously selected up to a (punch) in-point set by the "AUTO" button, recording input is continuously selected from the in-point to an out-point, and from the out-point, reproduction input is continuously selected. "INDI." is a button for use in carrying out individual setting on a track-by-track basis. For a track specified as a recording track, recording input is selected. However, by changing the setting, it is possible to select recording input even for a reproducing track. "ALL" is a button for use in selecting recording input for all the tracks.

Figure 9B:
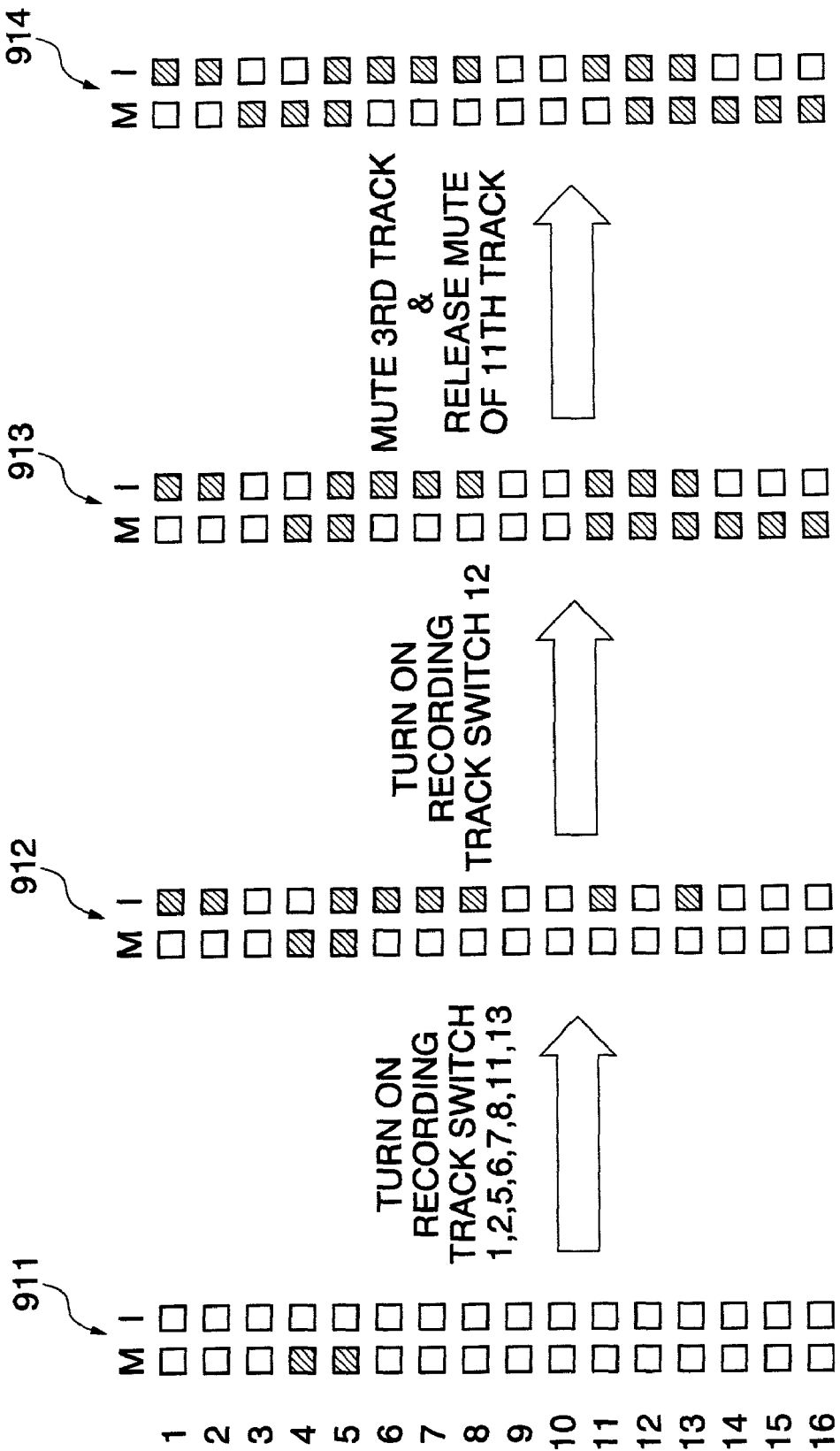

FIGS. 9A and 9B show how reproducing tracks are automatically muted in response to designation of recording tracks. Each track can be designated as a recording track by turning on a corresponding one of the 16 recording track switches 263 (see FIG. 2) corresponding to the 16 tracks. A plurality of recording track switches can be turned on simultaneously. Therefore, when a plurality of tracks are designated as recording tracks, sounds based on recording input signals are recorded simultaneously on the respective tracks designated as recording tracks, in response to an instruction for starting the recording.

FIG. 9A shows changes in the settings when recording tracks are increased by twos in the 24-bit mode. According to "the relationship between the number of tracks available for simultaneous recording and that of tracks available for simultaneous reproduction" described hereinbefore, tracks are automatically muted (in descending order of the track number, i.e. the largest track number first) by a number corresponding to that of tracks inhibited from use for reproduction. More specifically, when the recording track switches 2 and 3 are turned on in a state 901 appearing on the left-hand side of FIG. 9A, where the track 1 is already in a recording state, the tracks 2 and 3 in addition to the track 1 are placed in a recording state, as shown by the following state 902 in the figure. At this time, since the number of recording tracks is thus increased to 3, the number of tracks available for reproduction is reduced to 12. Consequently, the tracks 13 to 16 having the largest track numbers are automatically muted, and the remaining twelve tracks 1 to 12 are used for reproduction.

Further, when the recording track switches 4 and 5 are turned on in the state 902, the tracks 4 and 5 in addition to the tracks 1 to 3 are placed in a recording state, as shown by the following state 903 in the figure. At this time, since the number of recording tracks is thus increased to 5, the number of tracks available for reproduction is reduced to 8. Consequently, the tracks 9 to 12 having the largest track numbers among the tracks 1 to 12 are automatically muted in addition to the tracks 13 to 16 already muted, and the remaining twelve tracks 1 to 8 are used for reproduction.

Further, when the recording track switches 6 and 7 are turned on in the state 903, the tracks 1 to 7 are placed in a recording state, as shown by the following state 904 in the figure. At this time point, the number of recording tracks is thus increased to 7, but the number of tracks available for reproduction does not change. In this case, the eight tracks 1 to 8 remain available for reproduction, and hence in the state 904, it is not required to increase the number of muted tracks.

Further, when the recording track switches 8 and 9 are turned on in the state 904, the tracks 1 to 9 are placed in a recording state, as shown by the following state 905 in the figure. At this time, since the number of recording tracks is thus increased to 9, the number of tracks available for reproduction is reduced to 0. Consequently, all the tracks are automatically muted.

FIG. 9B shows a state where 8 recording tracks and 2 muted tracks are set in the 16-bit mode, as well as changes which occur when 9 tracks are designated as recording tracks in this state. In this case, 6 muted tracks are automatically set in addition to the two already set. More specifically, when the recording track switches 1, 2, 5, 6, 7, 8, 11, 13 are turned on in a state 911 appearing on the left-hand side of FIG. 9B, where the tracks 4 and 5 are muted, the tracks corresponding to the recording track switches turned on are placed in a recording state, as shown by the following state 912 in the figure. At this time, the number of recording tracks is thus increased to 8, but all the 16 tracks are still available for reproduction. Consequently, since it is not required to increase muted tracks, there occurs no change in the status of the muting of tracks.

Further, when the recording track switch 12 is turned on in the state 912, the number of recording tracks is increased to 9 as shown by the following state 913, and hence the number of tracks available for reproduction is reduced to 8. Consequently, the tracks 11 to 16 having the largest track numbers are automatically muted in addition to the tracks 4 and 5 already muted, and the remaining eight tracks 1 to 3 and 6 to 10 are used for reproduction.

Transition from the state 913 to a state 914 shows a case of changing a track to be muted. In this example, muting of one track is started, and instead, the muting of another track is canceled. As is apparent from this example, so long as the number of muted tracks is larger than that of tracks inhibited from use for reproduction, it is possible to change one or more tracks to be muted, as desired. Conversely, it is impossible to set the number of muted tracks to a number below that of tracks inhibited from use for reproduction. In such a case, even if an operation of canceling muting is attempted, it cannot effect the cancellation.

FIG. 10 shows a view of a QUICK REC screen displayed in response to operation of the QUICK REC key 267 appearing in FIG. 2. While the present apparatus allows flexible assignment by the input patch and the output patch, it takes time and labor to set the patching. To eliminate this inconvenience, the FIG. 10 QUICK REC screen is provided so as to allow a plurality of input channels, routings and tracks to be collectively set in a manner suited for an initial recording.

In FIG. 10, in an area denoted by "INPUT CH" designated by reference numeral 1001, it is possible to select one of three blocks: the eight analog inputs "AD1 to AD8", the eight inputs from the slot 1 "SL1in_1 to 8", and the eight inputs from the slot 2 "SL2in_1 to 8". Further, "Status Quo" may be provided as an option for maintaining the present settings. In an area denoted by "MIXER CH" designated by reference numeral 1002, there are fixedly displayed two blocks: the mixer input channels 1 to 8 and the mixer input channels 9 to 16. Similarly, in an area denoted by "REC TR" designated by reference numeral 1003, there are fixedly displayed two blocks: the recording track numbers 1 to 8 and the recording track numbers 9 to 16. The areas "MIXER CH" and "REC TR" cannot be modified by operating the operating elements.

When the user configures the settings for the area "INPUT CH" 1001 as desired and gives an instruction by an EXECUTE 1004 on the screen, the input patch is set such that each input displayed in the "INPUT CH" is inputted to one of the input channels displayed in the "MIXER CH", and at the same time the recording selector 318 is set such an input from each input channel displayed in the "MIXER CH" is inputted (via the direct-out connection) to one of the tracks of the internal recorder displayed in the "REC TR".

It should be noted that the operations described above with reference to FIGS. 4 to 10 are realized by execution of predetermined control programs by the CPU 104.

It goes without saying that the functions of the embodiment described above can be realized in the form of a program as software, whereby the object of the present invention can be attained.

Further, it also goes without saying that the objects of the present invention may be accomplished by supplying a storage medium in which is stored a software program realizing the functions of the above-mentioned embodiments to a system or apparatus, and causing a computer (CPU or MPU) of the system or apparatus to read out and execute the program stored in the storage medium.

In this case, the code of the program itself read out from the storage medium achieves the novel functions of the above embodiments, and the storage medium storing the program constitutes the present invention.

The storage medium for supplying the program to the system or apparatus may be in the form of a floppy disk, a hard disk, an optical memory disk, an magneto-optical disk, a CD-ROM, a CD-R (CD-Recordable), DVD-ROM, a semiconductor memory, a magnetic tape, a nonvolatile memory card, or a ROM, for instance. Further, the program code may be supplied from a server computer via a MIDI apparatus or a communication network.

Further, needless to say, not only the functions of the above embodiments can be realized by carrying out the program read out by the computer but also an OS (operating system) or the like operating on the computer can carry out part or whole of actual processing in response to instructions of the code-of the program, thereby making it possible to implement the functions of the above embodiments.

Furthermore, it goes without saying that after the code of the program read out from the storage medium has been written in a memory incorporated in a function extension board inserted in the computer or in a function extension unit connected to the computer, a CPU or the like arranged in the function extension board or the function extension unit may carry out part or whole of actual processing in response to the instructions of the code of the next program, thereby making it possible to achieve the functions of the above embodiments.

What is claimed is:

1. A multi-track digital recording/reproducing apparatus for recording and reproducing digital audio data by using multiple tracks, comprising:

a recording track-setting section that sets each of a plurality of tracks to one of a recording ON state and a recording OFF state in response to operation by user;

a mute track-setting section that sets each of a plurality of tracks to one of a mute ON state and a mute OFF state, in response to operation by user, the digital audio data being recorded on the tracks set to the recording ON state while the recorded digital audio data being reproduced from the tracks set to the mute OFF state, wherein each track is settable to the recording ON state and the mute OFF state simultaneously;

a reproducible track number-determining section that determines a reproducible number indicating a number of tracks that can be reproduced simultaneously, said reproducible number determined based on the number of tracks set to the recording ON state; and a reproducing track number-limiting section that limits a number of tracks to be set to the mute OFF state based on said number of reproducible tracks, wherein said reproducing track-number limiting section automatically changes at least predetermined one of the tracks from the mute OFF state to the mute ON state when said recording track-setting section increases the number of tracks set to the recording ON state and said reproducible number decreases below the number of tracks set to the mute OFF state, said reproducing track number-limiting section inhibits said mute track-setting section from setting more than said reproducible number of tracks to the mute OFF state.

2. A multi-track digital recording/reproducing method using a multi-track digital recording/reproducing apparatus for recording and reproducing digital audio data by using multiple tracks, the multi-track digital recording/reproducing method comprising:

a recording track-setting step of selectively setting each of a plurality of tracks to one of a recording ON state and a recording OFF state;

a mute track-setting step of selectively setting each of a plurality of tracks to one of a mute ON state and a mute OFF state, the digital audio data being recorded on the tracks set to the recording ON state while the recorded digital audio data being reproduced from the tracks set to the mute OFF state, wherein each track is settable to the recording ON state and the mute OFF state simultaneously;

a reproducible track number-determining step of determining a reproducible number indicating a number of tracks that can be reproduced simultaneously, said reproducible number determined based on a number of tracks set to the recording ON state; and a reproducing track number-limiting step of limiting a number of tracks to be set to the mute OFF state based on said number of reproducible tracks, wherein said reproducing track-number limiting section changes at least predetermined one of the tracks from the mute OFF state to the mute ON state when said recording track-setting step increases the number of tracks set to the recording ON state and said reproducible number decreases below the number of tracks set to the mute OFF state, and wherein said mute track-setting step does not set more than said reproducible number of tracks to the mute OFF state.

3. A computer-readable medium containing a computer program, the program containing executable instructions for causing a multi-track digital recording/reproducing apparatus to record and reproduce digital audio data by using multiple tracks, the multi-track digital recording/reproducing apparatus including a recording track-setting section and a mute track-setting section, the program comprising:

a recording track-setting module that sets each of a plurality of tracks to one of a recording ON state and a recording OFF state, in response to a user operation of the recording track-setting section;

a mute track-setting module that sets each of a plurality of tracks to one of a mute ON state and a mute OFF state, in response to a user operation of the mute track-setting section, the digital audio data being recorded on the tracks set to the recording ON state while the recorded digital audio data being reproduced from the tracks set to the mute OFF state, wherein each track is settable to the recording ON state and the mute OFF state simultaneously;

a reproducible track number-determining module that determines a reproducible number indicating a number of tracks that can be reproduced simultaneously, said reproducible number determined based on a number of tracks of the plurality of tracks set to the recording ON state; and a reproducing track number-limiting module that limits a number of tracks to be set to the mute OFF state based on said number of reproducible tracks, wherein said reproducing track-number limiting module automatically changes at least predetermined one of the tracks from the mute OFF state to the mute ON state when said recording track-setting module increases the number of tracks set to the recording ON state and said reproducible number decreases below the number of tracks set to the mute OFF state, said reproducing track number-limiting section inhibits said mute track-setting module from setting more than said reproducible number of tracks to the mute OFF state.

4. A multi-track digital recording/reproducing apparatus according to claim 1, further comprising a mode designating section that designates an operation mode corresponding to a bit number of the digital audio data to be recorded in the operation mode from among a plurality of operation modes, wherein said reproducible track number-determining section determines the number of tracks available for simultaneous reproduction based on the designated operation mode and the number of tracks set to the recording ON state.

* * * * *